US011683077B2

(12) United States Patent
Liao et al.

(10) Patent No.: US 11,683,077 B2
(45) Date of Patent: Jun. 20, 2023

(54) COORDINATED TRANSMISSION CONTROL METHOD, APPARATUS, AND SYSTEM

(71) Applicant: HUAWEI TECHNOLOGIES CO., LTD., Guangdong (CN)

(72) Inventors: Xiangbai Liao, Wuhan (CN); Yingzhuang Liu, Wuhan (CN); Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 227 days.

(21) Appl. No.: 16/931,551

(22) Filed: Jul. 17, 2020

(65) Prior Publication Data

US 2020/0350964 A1     Nov. 5, 2020

Related U.S. Application Data

(63) Continuation of application No. PCT/CN2019/072313, filed on Jan. 18, 2019.

(30) Foreign Application Priority Data

Jan. 19, 2018     (CN) .......................... 201810054522.8

(51) Int. Cl.
*H04B 7/0456* (2017.01)
*H04B 7/06* (2006.01)
(Continued)

(52) U.S. Cl.
CPC ......... *H04B 7/0456* (2013.01); *H04B 7/0617* (2013.01); *H04L 5/0073* (2013.01);
(Continued)

(58) Field of Classification Search
CPC ... H04B 7/0456; H04B 7/0617; H04L 5/0073; H04L 25/0202; H04W 24/08; H04W 28/18
See application file for complete search history.

(56) References Cited

U.S. PATENT DOCUMENTS 9,385,793 B2    7/2016    Harel et al.
9,451,624 B2    9/2016    Sadek
(Continued)

FOREIGN PATENT DOCUMENTS

CN    102547910 A    7/2012
CN    104811285 A    7/2015
(Continued)

OTHER PUBLICATIONS

International Search Report dated Apr. 16, 2019, issued in Application No. PCT/CN2019/072313, with English translation (11 pages).
(Continued)

*Primary Examiner* — Ricky Q Ngo
*Assistant Examiner* — Stephen N Steiner
(74) *Attorney, Agent, or Firm* — WHDA, LLP

(57) ABSTRACT

A coordinated transmission control method, apparatus, and system are disclosed. A primary access point and a secondary access point determine whether to perform coordinated transmission through inter-cell configuration parameter sharing and based on a dual decision condition of an interference test, further determine an anti-interference beamforming manner based on a specific cell configuration parameter, and determine whether to perform coordinated transmission with reference to the dual decision condition of the interference test, so that the access points can learn an interference status in advance, thereby preventing unnecessary retransmission resulting from interference caused during actual coordinated transmission, and improving communication efficiency.

16 Claims, 18 Drawing Sheets

| Category Category | Basic service set color or sending address (AP 1) | Uplink and downlink indication | Receiver address | Quantity of antennas (AP 1) | Quantity of spatial flows (Cell 1) | Bandwidth/ Resource block (STA 1) | ... | FCS frame detection sequence |
|---|---|---|---|---|---|---|---|---|

(51) Int. Cl.
*H04L 5/00* (2006.01)
*H04L 25/02* (2006.01)
*H04W 24/08* (2009.01)
*H04W 28/18* (2009.01)
*H04W 84/12* (2009.01)
*H04W 92/20* (2009.01)

(52) U.S. Cl.
CPC ......... *H04L 25/0202* (2013.01); *H04W 24/08* (2013.01); *H04W 28/18* (2013.01); *H04W 84/12* (2013.01); *H04W 92/20* (2013.01)

(56) References Cited

U.S. PATENT DOCUMENTS

| | | |
|---|---|---|
| 9,480,069 B2 | 10/2016 | Sadek |
| 10,305,550 B2 | 5/2019 | Wang et al. |
| 2012/0140660 A1 | 6/2012 | Kang et al. |
| 2015/0230111 A1 | 8/2015 | Wang et al. |
| 2015/0288427 A1* | 10/2015 | Wang .................. H04W 72/085 370/329 |
| 2016/0073411 A1* | 3/2016 | Liu ....................... H04W 24/02 370/329 |
| 2020/0059808 A1* | 2/2020 | Lim ...................... H04W 72/04 |

FOREIGN PATENT DOCUMENTS

| | | |
|---|---|---|
| CN | 104956722 A | 9/2015 |
| CN | 105101417 A | 11/2015 |
| CN | 105554093 A | 5/2016 |
| CN | 106572489 A | 4/2017 |
| JP | 2010246113 A | 10/2010 |
| WO | 2012061325 A1 | 5/2012 |

OTHER PUBLICATIONS

IEEE 802.11-18/1982r0, Kiseon Ryu et al, "Consideration on multi-AP coordination for EHT", Nov. 2018 (11 pages).
Office Action dated Aug. 31, 2021, issued in counterpart JP Application No. 2020-539702, with English Translation. (4 pages).

* cited by examiner

| Category Category | Basic service set color or sending address (AP 1) | Uplink and downlink indication | Receiver address | Quantity of antennas (AP 1) | Quantity of spatial flows (Cell 1) | Bandwidth/ Resource block (STA 1) | ... | FCS frame detection sequence |
|---|---|---|---|---|---|---|---|---|

FIG. 3

| Legacy short training field L-STF | Legacy long training field L-LTF | Legacy signal field L-SIG | ... | NG signaling field NG-SIG-A/B | NG short training field NG-STF | NG long training field NG-LTF | Data Data |

FIG. 7a

| Legacy short training field L-STF | Legacy long training field L-LTF | Legacy signal field L-SIG | ... | NG signaling field NG-SIG-A/B | NG short training field NG-STF | NG long training field NG-LTF | Data Data | Interference test sequence |

FIG. 7b

| Legacy short training field L-STF | Legacy long training field L-LTF | Legacy signal field L-SIG | ... | NG signaling field NG-SIG-A/B | NG short training field NG-STF | NG long training field NG-LTF | Data Data | Filling | Interference test sequence |

FIG. 7c

COORDINATED TRANSMISSION CONTROL METHOD, APPARATUS, AND SYSTEM

CROSS-REFERENCE TO RELATED APPLICATIONS

This application is a continuation of International Application No. PCT/CN2019/072313, filed on Jan. 18, 2019, which claims priority to Chinese Patent Application No. 201810054522.8, filed on Jan. 19, 2018. The disclosures of the aforementioned applications are hereby incorporated by reference in their entireties.

TECHNICAL FIELD

This application relates to the field of communications technologies, and in particular, to a coordinated transmission control technology in a communications system.

BACKGROUND

With the development of wireless networks and the unceasing popularity of a wireless local area network (Wireless Local Area Network, WLAN for short) technology, WLAN devices are increasingly concentrated. Because wireless access points (Access Point, AP for short) are easy to deploy, increasingly concentrated APs also cause more inter-cell interference. How to prevent inter-user or inter-cell interference through control of coordinated transmission between APs to improve quality of service for users is an issue that needs to be considered.

SUMMARY

This application provides a coordinated transmission control method, apparatus, and system, to implement coordinated transmission between a plurality of APs and prevent interference.

According to a first aspect, a coordinated transmission control method and apparatus are provided.

In a possible design, the method is applied to a secondary access point AP, or may be applied to a station STA corresponding to the secondary AP. The method includes: receiving, by the secondary access point AP, a coordinated transmission request sent by a primary AP, where the coordinated transmission request carries negotiation parameter information; and when the secondary AP intends, based on the negotiation parameter information, to perform coordinated transmission with the primary AP, sending, by the secondary AP, interference test information to the primary AP, and receiving decision information that indicates whether to perform coordinated transmission and that is sent by the primary AP based on the interference test information. It can be understood that, in this design, the primary AP may be to schedule a station STA in a cell to perform uplink transmission, and the secondary AP may be to schedule a station STA in a cell to perform downlink transmission, but no limitation is set thereto.

In this design, whether to perform coordinated transmission is determined through inter-cell configuration parameter sharing and based on a dual decision condition of an interference test, so that the access points can learn an interference status in advance, thereby preventing unnecessary retransmission resulting from interference caused during actual coordinated transmission, and improving communication efficiency.

In a possible design, when the secondary AP does not intend, based on the negotiation parameter information, to perform coordinated transmission with the primary AP, the secondary AP does not provide a feedback to the primary AP within a preset time, or sends first response information to the primary AP to indicate that the secondary AP cannot perform coordinated transmission.

In a possible design, when the secondary AP intends to perform coordinated transmission with the primary AP, the secondary AP sends second response information to the primary AP to indicate that the secondary AP expects to perform coordinated transmission. It can be understood that the second response information is sent together with or separately from the interference test information.

In a possible design, the coordinated transmission request carries first indication information, and the first indication information is used to indicate whether the interference test information is sent together with the second response information.

In a possible design, the decision information is carried in a coordination acknowledgment frame or is carried in an uplink transmission trigger frame sent to a to-be-scheduled station STA.

In a possible design, the negotiation parameter information includes at least one of the following: a quantity of antennas of the primary AP and a quantity of spatial flows in a cell corresponding to the primary AP.

In a possible design, the sending, by the secondary AP, interference test information to the primary AP includes: if the quantity of spatial flows is less than or equal to the quantity of antennas of the primary AP, and a quantity of antennas of the secondary AP is greater than the quantity of antennas of the primary AP, sending, by the secondary AP, the interference test information to the primary AP by using a first precoding matrix $Q_2$, where $Q_2$ is a precoding matrix that is used to prevent interference to data reception performed by the primary AP and that is determined by the secondary AP according to a preset first standard; or if the quantity of spatial flows is less than the quantity of antennas of the primary AP, and a quantity of antennas of the secondary AP is less than or equal to the quantity of antennas of the primary AP, sending, by the secondary AP, second indication information to the primary AP to indicate a receive equalization matrix $W_1$ used by the primary AP to receive data, and sending the interference test information by using a second precoding matrix $Q_2'$, where $Q_2'$ is a precoding matrix that is used to prevent interference to data reception performed by the primary AP, that is used by the secondary AP to send data, and that is determined by the secondary AP according to a preset second standard, and $W_1$ is a receive equalization matrix used by the primary AP to receive data. According to this design, the secondary AP may determine an anti-interference beamforming manner based on a specific cell configuration parameter, thereby effectively avoiding interference.

In a possible design, the first standard is $H_{21}Q_2=0$, where $H_{21}$ is channel estimation information between the primary AP and the secondary AP; and the second standard is $W_1 H_{21} Q_2'=0$, where $H_{21}$ is channel estimation information between the primary AP and the secondary AP.

Correspondingly, a coordinated transmission control apparatus is provided. The apparatus may implement the corresponding method in the first aspect. For example, based on function forms, the apparatus may be an access point AP or a station STA. For example, the apparatus may be an access device or a station device, or may be a chip or a function module in these devices. The foregoing method may be implemented by software or hardware, or by hardware executing corresponding software.

In a possible design, the apparatus may include a processor and a memory. The processor is configured to support the apparatus in performing a corresponding function in the method in the first aspect. The memory is configured to be coupled to the processor, and stores a program (instruction) and data that are necessary for the apparatus. In addition, the apparatus may further include a communications interface that is configured to support the apparatus in communicating with another network element. The communications interface may be a transceiver.

In a possible design, the apparatus may include a transceiver unit. The transceiver unit is configured to: receive a coordinated transmission request sent by a primary AP, send interference test information to the primary AP, and receive decision information that indicates whether to perform coordinated transmission and that is sent by the primary AP based on the interference test information. Optionally, the apparatus may further include a processing unit, and the processing unit is configured to determine, based on the negotiation parameter information, that the apparatus intends to perform coordinated transmission with the primary AP.

According to a second aspect, a coordinated transmission control method and apparatus are provided.

In a possible design, the method is applied to a primary access point AP, or may be applied to a station STA corresponding to the primary AP. The method includes: sending, by the primary access point AP, a coordinated transmission request to at least one secondary access point AP, where the coordinated transmission request carries negotiation parameter information; when the secondary AP intends, based on the negotiation parameter information to perform coordinated transmission with the primary AP, receiving, by the primary AP, interference test information sent by the secondary AP; performing, by the primary AP, a reception interference test based on the interference test information, to determine whether interference is greater than or is greater than or equal to a predetermined threshold; and sending, by the primary AP based on a result of the determining, decision information to the secondary AP to indicate whether the secondary AP can perform coordinated transmission. It can be understood that, in this design, the primary AP may be to schedule a station STA in a cell to perform uplink transmission, and the secondary AP may be to schedule a station STA in a cell to perform downlink transmission, but no limitation is set thereto.

In this design, whether to perform coordinated transmission is determined through inter-cell configuration parameter sharing and based on a dual decision condition of an interference test, so that the access points can learn an interference status in advance, thereby preventing unnecessary retransmission resulting from interference caused during actual coordinated transmission, and improving communication efficiency.

In a possible design, when the secondary AP determines, based on the negotiation parameter information, to skip performing coordinated transmission with the primary AP, the primary AP receives no feedback from the secondary AP within a preset time, or receives first response information sent by the secondary AP, where the first response information is used to indicate that the secondary AP cannot perform coordinated transmission.

In a possible design, when the secondary AP intends to perform coordinated transmission with the primary AP, the primary AP receives second response information sent by the secondary AP, where the second response information is used to indicate that the secondary AP expects to perform coordinated transmission. Optionally, the second response information is sent together with or separately from the interference test information.

In a possible design, the coordinated transmission request carries first indication information, and the first indication information is used to indicate whether the interference test information is sent together with the second response information.

In a possible design, the decision information is carried in a coordination acknowledgment frame or is carried in an uplink transmission trigger frame sent to a to-be-scheduled station STA.

In a possible design, the negotiation parameter information includes at least one of the following: a quantity of antennas of the primary AP and a quantity of spatial flows in a cell corresponding to the primary AP.

In a possible design, the receiving, by the primary AP, interference test information sent by the secondary AP includes: if the quantity of spatial flows is less than or equal to the quantity of antennas of the primary AP, and a quantity of antennas of the secondary AP is greater than the quantity of antennas of the primary AP, receiving, by the primary AP, the interference test information sent by the secondary AP by using a first precoding matrix $Q_2$, where $Q_2$ is a precoding matrix that is used to prevent interference to data reception performed by the primary AP and that is determined by the secondary AP according to a preset first standard; or if the quantity of spatial flows is less than the quantity of antennas of the primary AP, and a quantity of antennas of the secondary AP is less than or equal to the quantity of antennas of the primary AP, further receiving, by the primary AP, second indication information sent by the secondary AP, where the second indication information is used to indicate a receive equalization matrix $W_1$ used by the primary AP to receive data; and receiving the interference test information sent by the secondary AP by using a second precoding matrix $Q_2'$, where $Q_2'$ is a precoding matrix that is used to prevent interference to data reception performed by the primary AP, that is used by the secondary AP to send data, and that is determined by the secondary AP according to a preset second standard, and $W_1$ is a receive equalization matrix used by the primary AP to receive data. According to this design, the secondary AP may determine an anti-interference beamforming manner based on a specific cell configuration parameter, thereby effectively avoiding interference.

In a possible design, the first standard is $H_{21}Q_2=0$, where $H_{21}$ is channel estimation information between the primary AP and the secondary AP; and the second standard is $W_1H_{21}Q_2'=0$, where $H_{21}$ is channel estimation information between the primary AP and the secondary AP.

Correspondingly, a coordinated transmission control apparatus is provided. The apparatus may implement the corresponding method in the second aspect. For example, based on function forms, the apparatus may be an access point AP or a station STA. For example, the apparatus may be an access device or a station device, or may be a chip or a function module in these devices. The foregoing method may be implemented by software or hardware, or by hardware executing corresponding software.

In a possible design, the apparatus may include a processor and a memory. The processor is configured to support the apparatus in performing a corresponding function in the method in the second aspect. The memory is configured to be coupled to the processor, and stores a program (instruction) and data that are necessary for the apparatus. In addition, the apparatus may further include a communications interface that is configured to support the apparatus in communicating with another network element. The communications interface may be a transceiver.

In a possible design, the apparatus may include a transceiver unit. The transceiver unit is configured to: send a coordinated transmission request to at least one secondary AP, receive interference test information sent by the secondary AP, and send decision information to the secondary AP to indicate whether the secondary AP can perform coordinated transmission. Optionally, the apparatus may further include a processing unit, and the processing unit is configured to perform a reception interference test based on the interference test information, to determine whether interference is greater than or is greater than or equal to a predetermined threshold.

According to a third aspect, a coordinated transmission control method and apparatus are provided.

In a possible design, the method is applied to a secondary access point AP, or may be applied to a station STA corresponding to the secondary AP.

The method includes: receiving, by the secondary access point AP, a coordinated transmission request sent by a primary AP, where the coordinated transmission request carries negotiation parameter information; when the secondary AP intends, based on the negotiation parameter information, to perform coordinated transmission with the primary AP, sending, by the secondary AP, first response information to the primary AP to indicate that the secondary AP expects to perform coordinated transmission; receiving, by the secondary AP, interference test information sent by the primary AP; and determining, by the secondary AP based on an interference test result of the interference test information, whether to perform coordinated transmission. It can be understood that, in this design, the primary AP may be to schedule a station STA in a cell to perform downlink transmission, and the secondary AP may be to schedule a station STA in a cell to perform uplink transmission, but no limitation is set thereto.

In this design, whether to perform coordinated transmission is determined through inter-cell configuration parameter sharing and based on a dual decision condition of an interference test, so that the access points can learn an interference status in advance, thereby preventing unnecessary retransmission resulting from interference caused during actual coordinated transmission, and improving communication efficiency.

In a possible design, when the secondary AP determines, based on the negotiation parameter information, to skip performing coordinated transmission with the primary AP, the secondary AP does not provide a feedback to the primary AP within a preset time, or sends second response information to the primary AP to indicate that the secondary AP cannot perform coordinated transmission.

In a possible design, the determining, by the secondary AP based on an interference test result of the interference test information, whether to perform coordinated transmission includes: if interference is less than or equal to a predetermined threshold, sending, by the secondary AP, a trigger frame to a to-be-scheduled second station STA, and scheduling the second STA to perform uplink data transmission, or if interference is greater than the predetermined threshold, skipping sending, by the secondary AP, the trigger frame; or if interference is less than a predetermined threshold, sending, by the secondary AP, a trigger frame to a to-be-scheduled second STA, and scheduling the second STA to perform uplink data transmission, or if interference is greater than or equal to the predetermined threshold, skipping sending, by the secondary AP, the trigger frame.

In a possible design, the interference test information includes information about a corresponding training field in a downlink data packet sent by the primary AP to a to-be-scheduled first STA; or the interference test information is information about a corresponding field in a separate data packet sent by the primary AP before the primary AP sends a downlink data packet to the first STA.

In a possible design, when the interference test information includes the information about the corresponding training field in the downlink data packet sent by the primary AP to the first STA, transmission of the trigger frame starts in a transmission process of the downlink data packet, and uplink data transmission of the to-be-scheduled second STA ends before transmission of a data field in the downlink data packet ends, or ends at the same time as transmission of a data field in the downlink data packet; or when the interference test information includes the information about the corresponding field in the separate data packet sent by the primary AP to the first STA, transmission of the trigger frame starts before transmission of a data field in the downlink data packet sent by the primary AP to the first STA ends, and uplink data transmission of the to-be-scheduled second STA ends before transmission of the data field in the downlink data packet ends, or ends at the same time as transmission of the data field in the downlink data packet.

In a possible design, the negotiation parameter information includes at least one of the following: a quantity of antennas of the primary AP and a quantity of spatial flows in a cell corresponding to the primary AP.

In a possible design, the receiving, by the secondary AP, interference test information sent by the primary AP includes: receiving, by the secondary AP by using a selected receive equalization matrix used to prevent the primary AP from causing interference to data reception performed by the secondary AP, the interference test information sent by the primary AP, where if the quantity of spatial flows is less than or equal to the quantity of antennas of the primary AP, and a quantity of antennas of the secondary AP is greater than the quantity of antennas of the primary AP, the secondary AP selects a first receive equalization matrix $W_2$ according to a first standard; or if the quantity of spatial flows is less than the quantity of antennas of the primary AP, and a quantity of antennas of the secondary AP is less than or equal to the quantity of antennas of the primary AP, the secondary AP selects, according to a second standard, a second receive equalization matrix $W_2'$ and a precoding matrix $Q_1$ that is used by the primary AP to send data. Before the receiving, by the secondary AP, interference test information sent by the primary AP, the method further includes: sending, by the secondary AP, first indication information to the primary AP to indicate the precoding matrix $Q_1$ used by the primary AP to send data. According to this design, the secondary AP may determine an anti-interference beamforming manner based on a specific cell configuration parameter, thereby effectively avoiding interference.

In a possible design, the first standard is $W_2H_{21}=0$, where $H_{21}$ is channel estimation information between the primary AP and the secondary AP; and the second standard is $W_2'H_{21}Q_1=0$, where $H_{21}$ is channel estimation information between the primary AP and the secondary AP.

Correspondingly, a coordinated transmission control apparatus is provided. The apparatus may implement the corresponding method in the third aspect. For example, based on function forms, the apparatus may be an access point AP or a station STA. For example, the apparatus may be an access device or a station device, or may be a chip or a function module in these devices. The foregoing method may be implemented by software or hardware, or by hardware executing corresponding software.

In a possible design, the apparatus may include a processor and a memory. The processor is configured to support the apparatus in performing a corresponding function in the method in the third aspect. The memory is configured to be coupled to the processor, and stores a program (instruction) and data that are necessary for the apparatus. In addition, the apparatus may further include a communications interface that is configured to support the apparatus in communicating with another network element. The communications interface may be a transceiver.

In a possible design, the apparatus may include a transceiver unit. The transceiver unit is configured to: receive a coordinated transmission request sent by a primary AP, send first response information to the primary AP, and receive interference test information sent by the primary AP. Optionally, the apparatus may further include a processing unit, and the processing unit is configured to determine, based on an interference test result of the interference test information, whether to perform coordinated transmission.

According to a fourth aspect, a coordinated transmission control method and apparatus are provided.

In a possible design, the method is applied to a primary access point AP, or may be applied to a station STA corresponding to the primary AP. The method includes: sending, by the primary access point AP, a coordinated transmission request to a secondary AP, where the coordinated transmission request carries negotiation parameter information; when the secondary AP intends, based on the negotiation parameter information, to perform coordinated transmission with the primary AP, receiving, by the primary AP, first response information sent by the secondary AP, where the first response information is used to indicate that the secondary AP expects to perform coordinated transmission; and sending, by the primary AP, interference test information to the secondary AP, where the interference test information is used by the secondary AP to perform an interference test to determine whether to perform coordinated transmission. It can be understood that, in this design, the primary AP may be to schedule a station STA in a cell to perform downlink transmission, and the secondary AP may be to schedule a station STA in a cell to perform uplink transmission, but no limitation is set thereto.

In this design, whether to perform coordinated transmission is determined through inter-cell configuration parameter sharing and based on a dual decision condition of an interference test, so that the access points can learn an interference status in advance, thereby preventing unnecessary retransmission resulting from interference caused during actual coordinated transmission, and improving communication efficiency.

In a possible design, when the secondary AP determines, based on the negotiation parameter information, to skip performing coordinated transmission with the primary AP, the primary AP receives no feedback from the secondary AP within a preset time, or receives second response information sent by the secondary AP, where the second response information is used to indicate that the secondary AP cannot perform coordinated transmission.

In a possible design, the method further includes: receiving, by the primary AP, first indication information sent by the secondary AP, where the first indication information is used to indicate a precoding matrix $Q_1$ used by the primary AP to send data, and the interference test information is sent by using $Q_1$. According to this design, the secondary AP may determine an anti-interference beamforming manner based on a specific cell configuration parameter, thereby effectively avoiding interference.

In a possible design, the interference test information includes information about a corresponding training field in a downlink data packet sent by the primary AP to a to-be-scheduled station STA; or the interference test information is information about a corresponding field in a separate data packet sent by the primary AP before the primary AP sends a downlink data packet to the to-be-scheduled station STA.

In a possible design, the negotiation parameter information includes at least one of the following: a quantity of antennas of the primary AP and a quantity of spatial flows in a cell corresponding to the primary AP.

Correspondingly, a coordinated transmission control apparatus is provided. The apparatus may implement the corresponding method in the fourth aspect. For example, based on function forms, the apparatus may be an access point AP or a station STA. For example, the apparatus may be an access device or a station device, or may be a chip or a function module in these devices. The foregoing method may be implemented by software or hardware, or by hardware executing corresponding software.

In a possible design, the apparatus may include a processor and a memory. The processor is configured to support the apparatus in performing a corresponding function in the method in the fourth aspect. The memory is configured to be coupled to the processor, and stores a program (instruction) and data that are necessary for the apparatus. In addition, the apparatus may further include a communications interface that is configured to support the apparatus in communicating with another network element. The communications interface may be a transceiver.

In a possible design, the apparatus may include a transceiver unit. The transceiver unit is configured to: send a coordinated transmission request to a secondary AP, receive first response information sent by the secondary AP, and send interference test information to the secondary AP. Optionally, the apparatus may further include a processing unit, and the processing unit is configured to determine to-be-sent information or process received information.

This application further provides a computer storage medium, where the computer storage medium stores a computer program (instruction). When the program (instruction) is run on a computer, the computer is enabled to perform the method in any one of the foregoing aspects.

This application further provides a computer program product. When the computer program product is run on a computer, the computer is enabled to perform the method according to any one of the foregoing aspects.

This application further provides a chip configured for coordinated transmission control, where the chip stores an instruction. When the instruction is run on a communications device, the communications device is enabled to perform the corresponding methods in the foregoing aspects.

This application further provides a coordinated transmission control apparatus, including a memory, a processor, and a computer program that is stored in the memory and that can be run on the processor. When executing the computer program, the processor implements the corresponding methods in the foregoing aspects.

This application further provides a coordinated transmission control apparatus, including a processor. The processor is configured to be coupled to a memory, read an instruction in the memory, and implement the corresponding methods in the foregoing aspects according to the instruction. It can be understood that the memory may be integrated into the processor, or may exist independent of the processor.

This application further provides a coordinated transmission control apparatus, including a processor. When executing a computer program, the processor implements the corresponding methods in the foregoing aspects.

This application further provides a coordinated transmission control system, including the primary AP apparatus provided above and at least one secondary AP apparatus provided above. These components in the system can implement the corresponding methods in the foregoing aspects.

It can be understood that any apparatus, the computer storage medium, the computer program product, the chip, and the system that are provided above are all configured to implement the corresponding methods provided above. Therefore, for beneficial effects that can be achieved by the apparatus, the computer storage medium, the computer program product, the chip, and the system, refer to beneficial effects of the corresponding methods, and details are not described herein again.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the embodiments of this application and these accompanying drawings without creative efforts.

FIG. 3 is a schematic diagram of an information format of a coordinated (parallel) transmission request according to this application;

FIG. 7a is a schematic diagram of an information format of a coordinated (parallel) transmission response according to this application;

FIG. 7b is a schematic diagram of another information format of a coordinated (parallel) transmission response according to this application;

FIG. 7c is a schematic diagram of another information format of a coordinated (parallel) transmission response according to this application;

DESCRIPTION OF EMBODIMENTS

Figure 1:
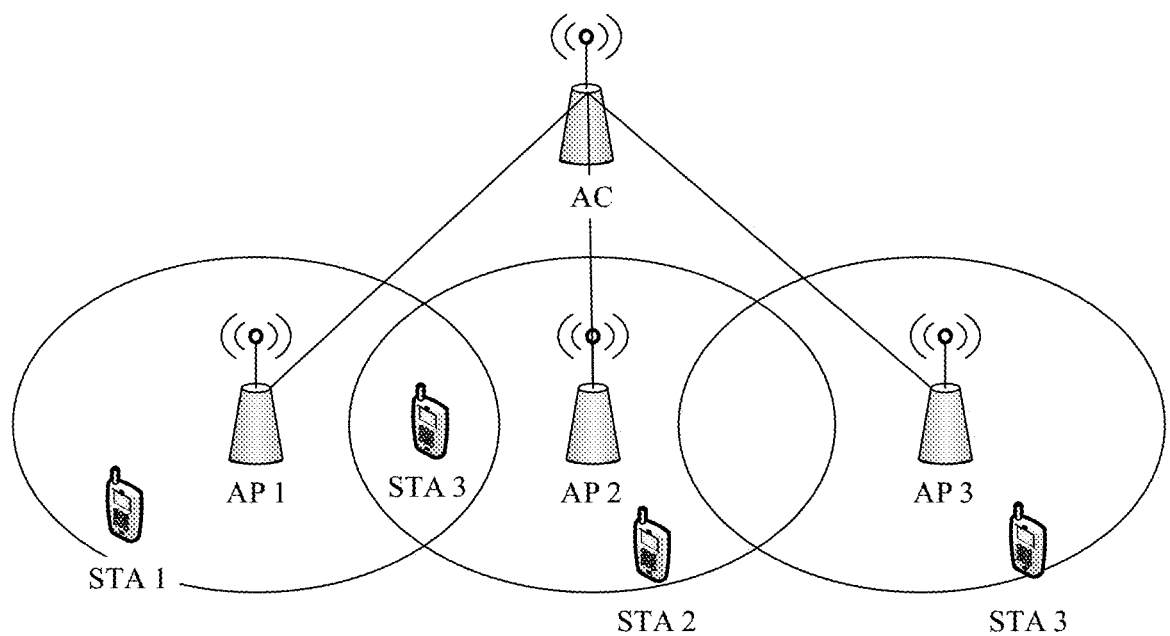
FIG. 1 shows an architecture of a network system according to this application.

To make technical problems to be resolved by this application, and the technical solutions used and technical effects achieved in this application clearer, the following further describes in detail the technical solutions in this application with reference to embodiments and accompanying drawings. The detailed descriptions provide various embodiments of a device and/or a process by using block diagrams, flowcharts, and/or examples. These block diagrams, flowcharts, and/or examples include one or more functions and/or operations, so persons in the art may understand that each function and/or operation in the block diagrams, the flowcharts, and/or the examples may be performed independently and/or jointly by using much hardware, software, and firmware, and/or any combination thereof.

"A plurality of" in this application refers to two or more than two. The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In this application, the terms "first", "second", and so on are intended to distinguish between different objects but do not indicate a particular order of the objects.

In this application, nouns "network" and "system" are usually interchangeably used, but a person skilled in the art can understand meanings of the nouns. In some cases, "stations (Station, STA for short)"/"terminals" mentioned in this application each may be a mobile device, for example, a mobile phone, a personal digital assistant, a handheld or laptop computer, and a similar device having a telecommunication capability. In some cases, the "station"/"terminal" may be a wearable device or the like, or may be any hardware or software component that can terminate a communication session of a user. In addition, "user terminal", "User Equipment", "UE", "terminal device", "user device", "user agent", "User Agent", "UA", "user equipment", "mobile device", "device", and the like are all alternative terms with same meanings as "station (Station, STA for short)"/"terminal" in this specification. For ease of description, the devices mentioned above are collectively referred to as sites or STAs in all the embodiments of this application.

An "access point (Access Point, AP for short)" mentioned in this application is a network device, that is, an apparatus deployed in a radio access network to provide a wireless communication function for a terminal device, and can be responsible for scheduling and configuring uplink/downlink transmission of a STA. The access point may include various forms of macro base stations, micro base stations, relay nodes, access points, and the like, and includes a system and a device as improvements of peer devices in a conventional wireless telecommunications system. Such an advanced device or a next-generation device may be included in a long term evolution LTE communications system, a 5G communications system, a future evolved system, or a plurality of types of communications convergence systems. A name of a device having an access point function may vary with systems using different radio access technologies. For ease of description, in this application, all the foregoing apparatuses that provide a wireless communications function for the STA are referred to as access points or APs.

The "coordinated transmission" mentioned in this application means: At least two APs/STAs each perform intra-cell communication transmission, and to avoid mutual interference between two cells, the APs/STAs perform coordinated transmission. Such coordinated transmission may also be referred to as parallel transmission because the at least two APs/STAs simultaneously perform transmission.

FIG. 1 provides an architecture of a network system in this application. In the system, there are two or more APs, and for each AP, there is one or more STAs associated with the AP. In addition, there are one primary AP (for example, an AP 1) and at least one secondary AP (for example, an AP 2 and an AP 3) among a plurality of APs. The AP 1 is an access point that obtains, through contention, a right to use a channel, or a primary AP that is elected by an AC (Access Controller) from an AP group as an access point that is in the AP group and whose transmission is preferentially ensured during joint transmission. The AP 1 serving as the primary AP may be an access point whose transmission is preferentially ensured. Optionally, the AP 1 may be elected from an AP group as a control point of the AP group according to a defined rule or become a control point of the AP group through contention. The AP 1 may perform functions of controlling and managing transmission, a resource, and the like on the AP group, and may coordinate coordinated transmission of a plurality of APs. Optionally, the functions of controlling and managing the AP group may be implemented by using an additional access controller (Access Controller, AC for short). An additional AC may be further disposed in the AP group to coordinate coordinated transmission of a plurality of APs. Wired transmission or wireless transmission may be used between APs and between an AP and an AC.

In the system, if the AP 1 schedules a STA 1 in a cell served by the AP 1 to perform uplink transmission, and the AP 2 schedules a STA 2 in a cell served by the AP 2 to perform downlink transmission, because a distance is relatively short, the downlink transmission of the AP 2 causes possible strong interference to the AP 1 that performs uplink reception. Alternatively, if the AP 1 schedules a STA 1 in a cell served by the AP 1 to perform downlink transmission, and the AP 2 schedules a STA 2 in a cell served by the AP 2 to perform uplink transmission, because a distance is relatively short, the downlink transmission of the AP 1 causes possible strong interference to the AP 2 that performs uplink reception. To avoid interference, the cell served by the AP 1 and the cell served by the AP 2 are unable to perform coordinated transmission, leading to low communication efficiency. Therefore, in this application, coordinated transmission control is performed between a primary AP and a secondary AP, to improve communication efficiency while implementing interference control.

Embodiment 1

Figure 2:
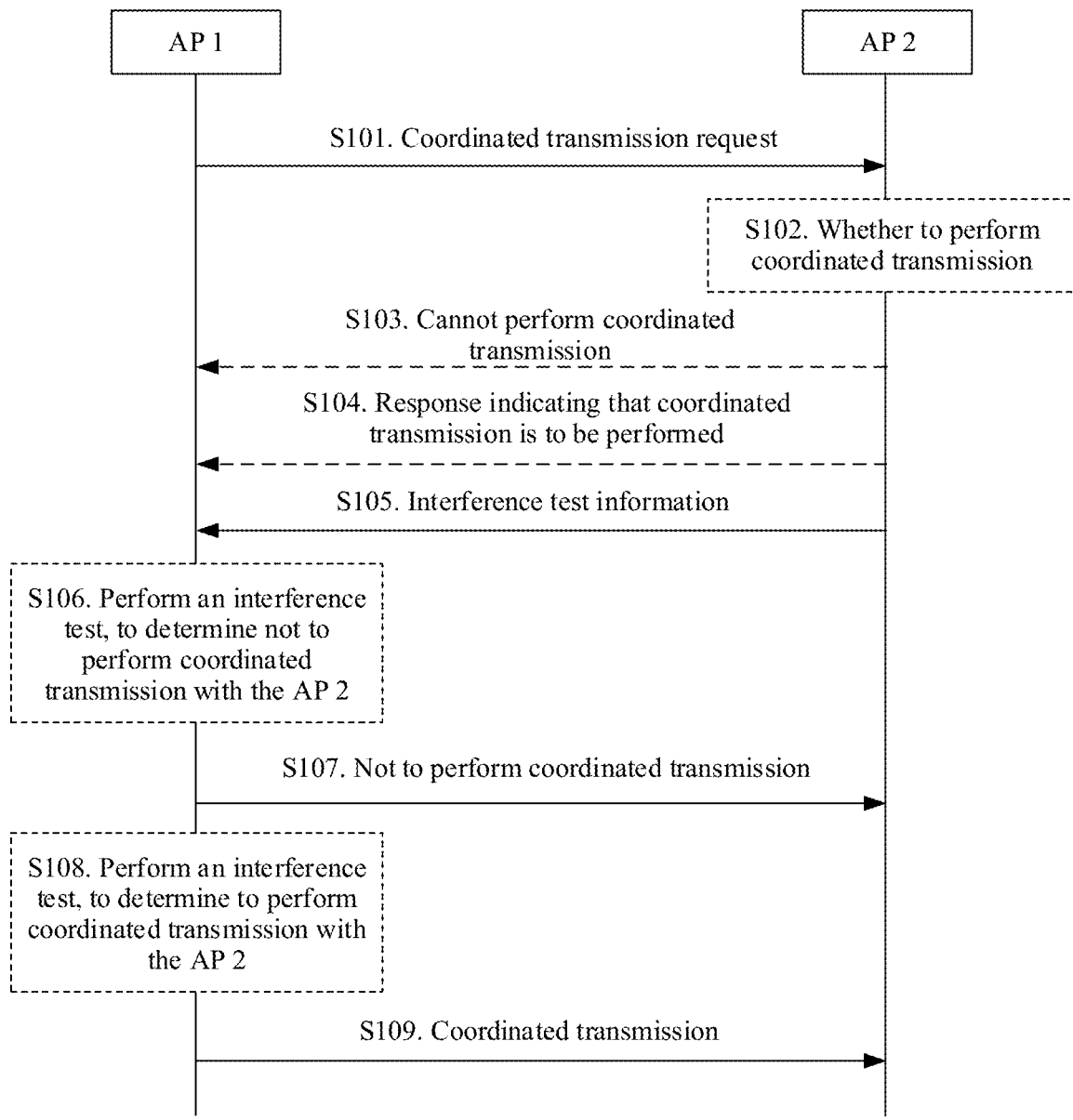
FIG. 2 is a flowchart of a first embodiment of a coordinated transmission control method according to this application.

In a system, if coordinated transmission needs to be performed between a primary access point (an AP 1) and at least one secondary access point (an AP 2, an AP 3, and the like), a method in this embodiment needs to be used to perform coordinated transmission control to prevent inter-cell interference. According to this embodiment of this application, FIG. 2 is a flowchart of a first embodiment of a coordinated transmission control method according to this application. This embodiment is described by using a scenario in which an AP 1 is to perform uplink transmission and an AP 2 is to perform downlink transmission as an example, but no limitation is set thereto. A station correspondingly scheduled by the AP 1 is a STA 1, and a station correspondingly scheduled by the AP 2 is a STA 2. To facilitate understanding of the solution, overall descriptions of this embodiment and subsequent embodiments are provided from a perspective of a plurality of interacting parties by using an example in which the AP 2 is used as a secondary access point. However, this certainly does not mean that an improvement to the system requires steps on all interacting sides be performed together. In the technical solution proposed in this application, an improvement is made on each side of the system.

The method includes the following steps.

S101. A secondary access point AP receives a coordinated transmission request sent by the AP 1, where the coordinated transmission request carries negotiation parameter information.

After an AP obtains a right to use a channel or is elected from the system, the AP is determined as a primary AP (that is, the AP 1), and other APs in the system are secondary APs (for example, the AP 2 and an AP 3). In this case, data transmission of the AP 1 and scheduling of the station STA 1 corresponding to the AP 1 need to be ensured in the system. The AP 1 determines to schedule the STA 1 to perform uplink transmission, and sends the coordinated transmission request to the secondary AP (for example, the AP 2). Optionally, an action (Action) frame may be used as an information format of the coordinated transmission request. For a specific structure of the frame, refer to FIG. 3. FIG. 3 is a schematic diagram of an information format of a coordinated (parallel) transmission request. The coordinated transmission request may carry negotiation parameter information, optionally including at least one of the following: a quantity of antennas of the AP 1, a quantity of spatial flows in a cell 1 served by the AP 1, a basic service set color (Basic Service Set Color, BSS Color for short) used to identify a cell served by the AP 1, a transmitter address (that is, an address of the AP 1), an uplink/downlink indication used to indicate whether the AP 1 is to perform uplink transmission or to perform downlink transmission (the AP 1 is to perform uplink transmission in this embodiment), a receiver address (that is, an address of the AP 2), and a bandwidth/resource block used by the to-be-scheduled STA 1 to send data. The foregoing parameter information does not constitute any limitation on this application. For example, the parameter information may further include transmit power and modulation and coding information.

S102. The AP 2 determines, based on the negotiation parameter information, whether to perform coordinated transmission with the AP 1.

The AP 2 may determine, based on the negotiation parameter information, whether to perform coordinated transmission with the AP 1. For example, the AP 2 determines, based on the quantity of spatial flows and information about the quantity of antennas of the AP 1 in combination with a quantity of antennas of the AP 2, whether the AP 2 can perform coordinated transmission with the AP 1. For example, if the quantity of spatial flows is equal to the quantity of antennas of the AP 1, and the quantity of antennas of the AP 2 is less than or equal to the quantity of antennas of the AP 1, the AP 2 cannot prevent, by using a reserved spatial direction, interference to uplink data reception performed by the AP 1, and therefore cannot perform coordinated transmission; and if the quantity of spatial flows is less than or equal to the quantity of antennas of the AP 1, and the quantity of antennas of the AP 2 is greater than the quantity of antennas of the AP 1, or if the quantity of spatial flows is less than the quantity of antennas of the AP 1, and the quantity of antennas of the AP 2 is less than or equal to the quantity of antennas of the AP 1, the AP 2 can prevent, by using a reserved spatial direction, interference to uplink data reception performed by the AP 1, and therefore can perform coordinated transmission. The foregoing is merely an example of this application. A manner in which the AP 2 determines whether to coordinate with the AP 1 is not limited thereto.

S103. When determining not to perform coordinated transmission with the AP 1, the AP 2 feeds back, to the AP 1, information indicating that the AP 2 cannot perform coordinated transmission.

This step is an optional step. When determining not to perform coordinated transmission with the AP 1, the AP 2 may feed back, by using this step, the information indicating that the AP 2 cannot perform coordinated transmission, to notify the AP 1. Optionally, if determining not to perform coordinated transmission with the AP 1, the AP 2 may not reply to the coordinated transmission request within a preset time, so that the AP 1 determines that the AP 2 cannot perform coordinated transmission. In this case, an operation of this step is not required.

If the AP 2 cannot perform coordinated transmission, the AP 1 may continue to select a secondary AP (for example, the AP 3) in another cell to perform coordinated transmission, or perform single-cell transmission.

S104. When determining to perform coordinated transmission with the AP 1, the AP 2 sends, to the AP 1, response information indicating that the AP 2 determines to perform coordinated transmission.

This step is an optional step, and interference test information sent in step S105 may alternatively indicate that the AP 2 determines to perform coordinated transmission. An information format of the response information may be an existing information format. FIG. 7a is a schematic diagram of an information format of a coordinated (coordinated) transmission response. The coordinated transmission response first includes a legacy short training field (Legacy Short Training Field, L-STF for short), a legacy long training field (Legacy Long Training Field, L-LTF for short), and a legacy signal field (Legacy Signal Field, L-SIG for short) that are used to ensure backward compatibility and indicate duration corresponding to data. A preamble further includes next generation signaling A and/or B (Next Generation Signaling A/B, NG-SIG-A/B for short) used to carry signaling information specific to the NG standard. NG indicates a code name, and may stand for Next Generation (next generation). Certainly, another code name may also be used. Follow-up fields include a next generation short training field (Next Generation Short Training Field, NG-STF for short) and a next generation long training field (Next Generation Long Training Field, NG-LTF for short) that are respectively used for automatic gain control (Automatic Gain Control, AGC for short) and channel measurement in a case of multiple input multiple output (Multiple Input Multiple Output, MIMO for short). The NG-LTF field may include a plurality of NG-LTF symbols, and is used for channel measurement in a plurality of space-time flows. A follow-up part is a data (Data) field used to carry a MAC frame, and the data field indicates that the AP 2 expects to perform coordinated transmission.

S105. When determining to perform coordinated transmission with the AP 1, the AP 2 sends the interference test information to the AP 1.

When step S104 is performed, the interference test information may be sent together with or separately from the response information indicating that the AP 2 determines to perform coordinated transmission. A frame structure used when the interference test information is sent together with the response information may be a data packet structure shown in FIG. 7b; or a frame structure used when the interference test information is sent together with the response information may be a data packet structure shown in FIG. 7c, where a padding field is further provided between the interference test information and a data field. A frame structure used when the interference test information is sent separately from the response information may be shown in FIG. 7d, where the interference test information and a response information frame are separated by a short interframe spacing. In both cases, whether the interference test information exists after the data field may be indicated by using a bit indication of a signal field of the response information.

It can be understood that, in step S101, the coordinated transmission request sent by the AP 1 may also indicate whether a data packet of the response information sent by the AP 2 is expected to carry the interference test information.

The interference test information may be an interference test sequence, and some existing sequences in the 802.11 standard may be used, for example, a legacy long training sequence (Legacy Long Training Field, L-LTF for short). The interference test sequence may be a high throughput long training sequence (High Throughput LTF, HT-LTF for short), a very high-rate long training sequence (Very HT LTF, VHT-LTF for short), a high efficient long training sequence (High Efficient LTF, HE-LTF for short), or may be a random sequence.

The interference test information may be sent by using a precoding matrix $Q_2$ used to prevent interference to data reception performed by the AP 1. Optionally, a selection criterion of $Q_2$ is $H_{21}Q_2=0$. $H_{21}$ is channel estimation information between the AP 1 and the AP 2, and this application is not limited thereto. Alternatively, considering a receive-end status in a cell served by the AP 2, the interference test information is sent by using another precoding matrix.

S106. The AP 1 performs an interference test based on the received interference test information, to determine not to perform coordinated transmission with the AP 2.

If step 104 is performed, the AP 1 may determine, based on a data field of the response information, whether the AP 2 is to perform coordinated transmission. Optionally, the AP 1 determines, based on a corresponding bit indication, whether the interference test information exists after the data field.

The AP 1 tests, by using the interference test information, whether interference to the AP 2 exceeds a predetermined threshold; and if the interference exceeds the threshold, may choose not to perform coordinated transmission with the AP 2. Optionally, if the interference is equal to the threshold, the AP 1 may choose not to perform coordinated transmission with the AP 2.

S107. When choosing not to perform coordinated transmission with the AP 2, the AP 1 sends information indicating that the AP 1 is not to perform coordinated transmission with the AP 2.

The information may be carried in a separate coordination acknowledgment frame and sent to the AP 2, or may be carried in an uplink transmission trigger frame omnidirectionally sent to the STA 1. The information may be a corresponding bit indication in the frame, for example, a 1-bit indication, and a value of the bit indication is 0 or 1. The information may alternatively be a corresponding identifier, for example, a reserved identifier or an identifier of an AP that exists in a non-surrounding cell, indicating that the AP 1 does not expect to perform coordinated transmission.

S108. The AP 1 performs an interference test based on the received interference test information, to determine to perform coordinated transmission with the AP 2.

If step 104 is performed, the AP 1 may determine, based on the data field of the response information, whether the AP 2 is to perform coordinated transmission. Optionally, the AP 1 determines, based on a corresponding bit indication, whether the interference test information exists after the data field.

The AP 1 tests, by using the interference test information, whether interference to the AP 2 exceeds the predetermined threshold; and if the interference does not exceed the threshold, may choose to perform coordinated transmission with the AP 2. Optionally, if the interference is equal to the predetermined threshold, the AP 1 may choose to perform coordinated transmission with the AP 2.

S109. When choosing to perform coordinated transmission with the AP 2, the AP 1 sends information indicating that the AP 1 is to perform coordinated transmission with the AP 2.

The information may be carried in a separate coordination acknowledgment frame and sent to the AP 2, or may be carried in an omnidirectionally sent uplink transmission trigger frame specific to the STA 1. The information may be a corresponding bit indication in the frame, for example, a 1-bit indication, and a value of the bit indication is 0 or 1. The information may alternatively be a corresponding identifier, for example, an identifier of the AP 2, indicating that the AP 1 expects to perform coordinated transmission.

It should be noted that if the AP 1 provides a feedback by using a separate coordination acknowledgment frame, regardless of whether coordinated transmission is selected, the AP 1 subsequently sends an uplink data transmission trigger frame to the STA 1 to be scheduled by the AP 1, and the STA 1 performs uplink data transmission after receiving the trigger frame. If the AP 1 provides a feedback by using the trigger frame, regardless of whether coordinated transmission is selected, the STA 1 performs uplink data transmission after receiving the trigger frame.

If the AP 1 chooses to perform coordinated transmission, the AP 2 sends downlink data to the to-be-scheduled STA 2 (if the interference test information is sent by using a specific precoding matrix such as $Q_2$ in S105, the downlink data is also sent by using $Q_2$) after receiving the coordination acknowledgment frame or the trigger frame, to perform coordinated transmission with the AP 1. It should be noted that, transmission of the AP 2 and the AP 1 ends at the same time, or downlink transmission of the AP 2 ends earlier than uplink transmission of the AP 1. Time information of the uplink transmission of the AP 1 may be carried in any one of the foregoing messages or frames.

It should be further noted that S103, S104, and S105 are not necessarily performed in a particular order, and are merely different processing in different cases. S106 and S107, and S108 and S109 are not necessarily performed in a particular order, and are merely different processing in different cases.

According to the coordinated transmission control method in this embodiment of this application, whether to perform coordinated transmission is determined through inter-cell configuration parameter sharing and based on a dual decision condition of an interference test, so that the access points can learn an interference status in advance, thereby preventing unnecessary retransmission resulting from interference caused during actual coordinated transmission, and improving communication efficiency.

Embodiment 2

Figure 4:
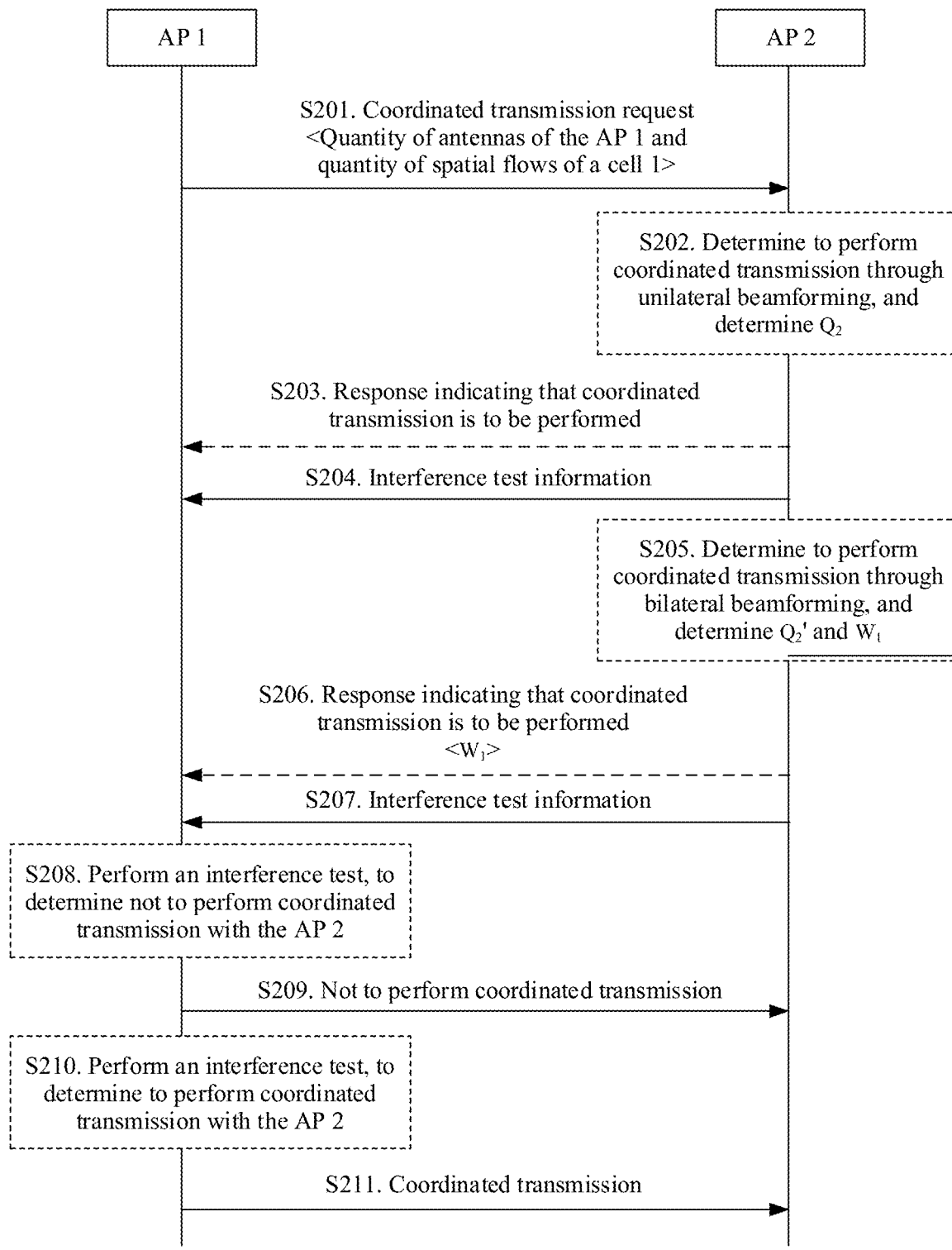
FIG. 4 is a flowchart of a second embodiment of a coordinated transmission control method according to this application.

FIG. 4 is a flowchart of a second embodiment of a coordinated transmission control method according to this application. A difference between this embodiment and Embodiment 1 lies in that: In this embodiment, a case in which an AP 2 determines to perform coordinated transmission is described, and transmission control procedures of coordinated transmission to be performed by the AP 2 in different conditions are specifically distinguished. Content that is the same as or similar to that in Embodiment 1 is not described in this embodiment again.

The method includes the following steps.

S201. An AP 1 sends a coordinated transmission request, and an AP 2 receives the coordinated transmission request sent by the AP 1, where the coordinated transmission request carries negotiation parameter information.

The carried negotiation parameter information mainly includes a quantity of antennas of the AP 1 and a quantity of spatial flows of a cell 1. This step is similar to S101 in Embodiment 1. For a detailed description, refer to S101. Details are not described herein again.

S202. The AP 2 determines, based on the negotiation parameter information, to perform coordinated transmission with the AP 1 through unilateral beamforming, and determines a precoding matrix $Q_2$ used by the AP 2 to send data.

The AP 2 may determine, based on the quantity of spatial flows and information about the quantity of antennas of the AP 1 in combination with a quantity of antennas of the AP 2, whether the AP 2 can perform coordinated transmission with the AP 1. If the quantity of spatial flows is less than or equal to the quantity of antennas of the AP 1, and the quantity of antennas of the AP 2 is greater than the quantity of antennas of the AP 1, the AP 2 can unilaterally prevent, by using a reserved spatial direction, interference to uplink data reception performed by the AP 1, and therefore can perform coordinated transmission. The precoding matrix $Q_2$ used to prevent interference to data reception performed by the AP 1 may be selected for data transmission. Optionally, a selection criterion of $Q_2$ is $H_{21}Q_2=0$, where $H_{21}$ is channel estimation information between the AP 1 and the AP 2. This application is not limited thereto.

S203. The AP 2 sends, to the AP 1, response information indicating that the AP 2 determines to perform coordinated transmission.

This step is an optional step, and interference test information sent in step S204 may alternatively indicate that the AP 2 determines to perform coordinated transmission. An information format of the response information may be a data packet structure shown in FIG. 7a, and a data field indicates that the AP 2 expects to perform coordinated transmission.

S204. The AP 2 sends the interference test information to the AP 1.

Figure 7D:
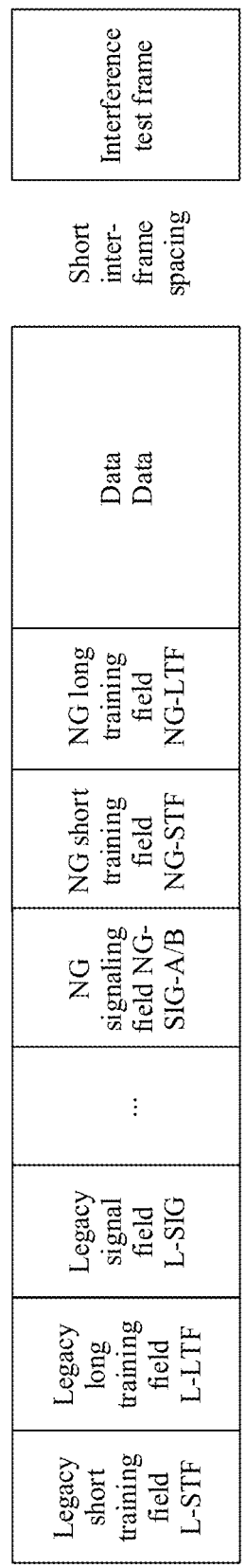
FIG. 7d is a schematic diagram of a transmission mode for coordinated (parallel) transmission response information and interference test information according to this application.

When step S203 is performed, the interference test information may be sent together with the response information indicating that the AP 2 determines to perform coordinated transmission (for a specific information format, refer to FIG. 7b or FIG. 7c), or the interference test information may be sent separately from the response information (for a specific information format, refer to FIG. 7d). The interference test information may be sent by using the precoding matrix $Q_2$.

S205. The AP 2 determines, based on the negotiation parameter information, to perform coordinated transmission with the AP 1 through bilateral beamforming, and determines a precoding matrix $Q_2'$ used by the AP 2 to send data and a receive equalization matrix $W_1$ used by the AP 1 to receive data.

The AP 2 may determine, based on the quantity of spatial flows and the information about the quantity of antennas of the AP 1 in combination with the quantity of antennas of the AP 2, whether the AP 2 can perform coordinated transmission with the AP 1. If the quantity of spatial flows is less than the quantity of antennas of the AP 1, and the quantity of antennas of the AP 2 is less than or equal to the quantity of antennas of the AP 1, interference to uplink data reception performed by the AP 1 may be prevented bilaterally by using reserved spatial directions, and therefore coordinated transmission can be performed.

When it is determined that interference to uplink data reception performed by the AP 1 may be prevented bilaterally by using the reserved spatial directions, the AP 2 not only needs to determine the precoding matrix $Q_2'$ of the AP 2 as a transmit end, but also needs to determine a receive equalization matrix used by the AP 1 to receive data, that is, the AP 2 performs transmit-end beamforming, and the AP 1 performs receive-end beamforming. $Q_2'$ of the AP 2 and $W_1$ of the AP 1 are determined according to the following optional standard: $W_1 H_{21} Q_2' = 0$, where $H_{21}$ is channel estimation information between the AP 1 and the AP 2. This application is not limited thereto.

S206. The AP 2 sends, to the AP 1, response information indicating that the AP 2 determines to perform coordinated transmission, where the response information carries indication information of the receive equalization matrix W1 used by the AP 1 to receive data.

Figure 7E:
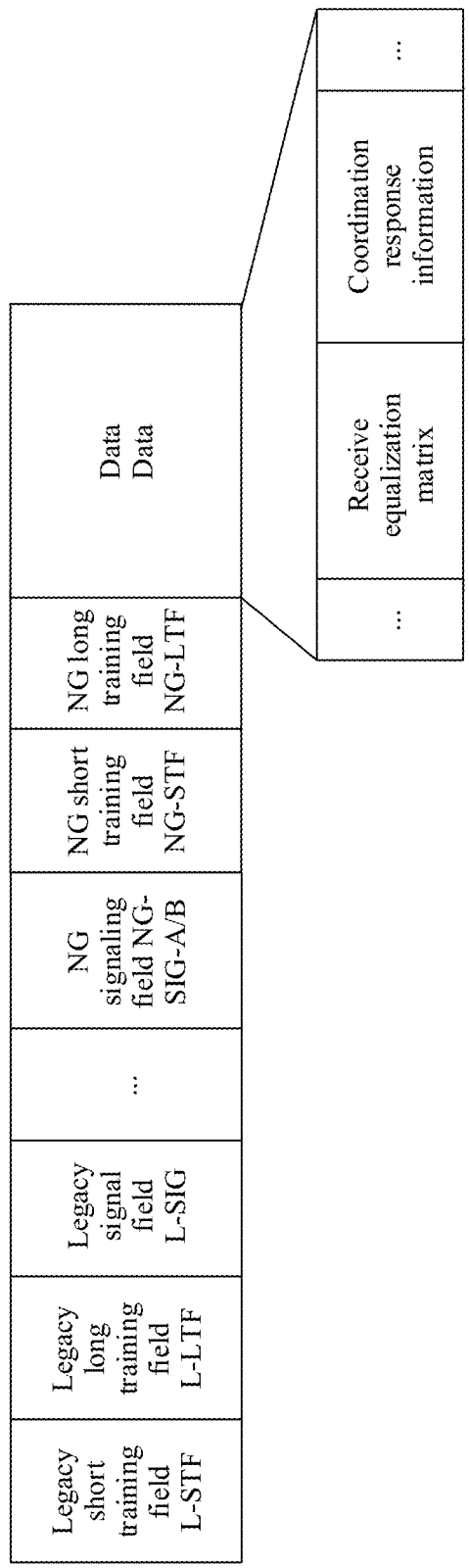
FIG. 7e is a schematic diagram of another information format of a coordinated (parallel) transmission response according to this application.

An information format of the response information may be a data packet structure shown in FIG. 7e. In addition to coordinated response information indicating whether the AP 2 is to perform coordinated transmission, a data field in the response information further carries information about the receive equalization matrix W1 used by the AP 1 to receive data.

S207. The AP 2 sends interference test information to the AP 1.

Figure 7F:
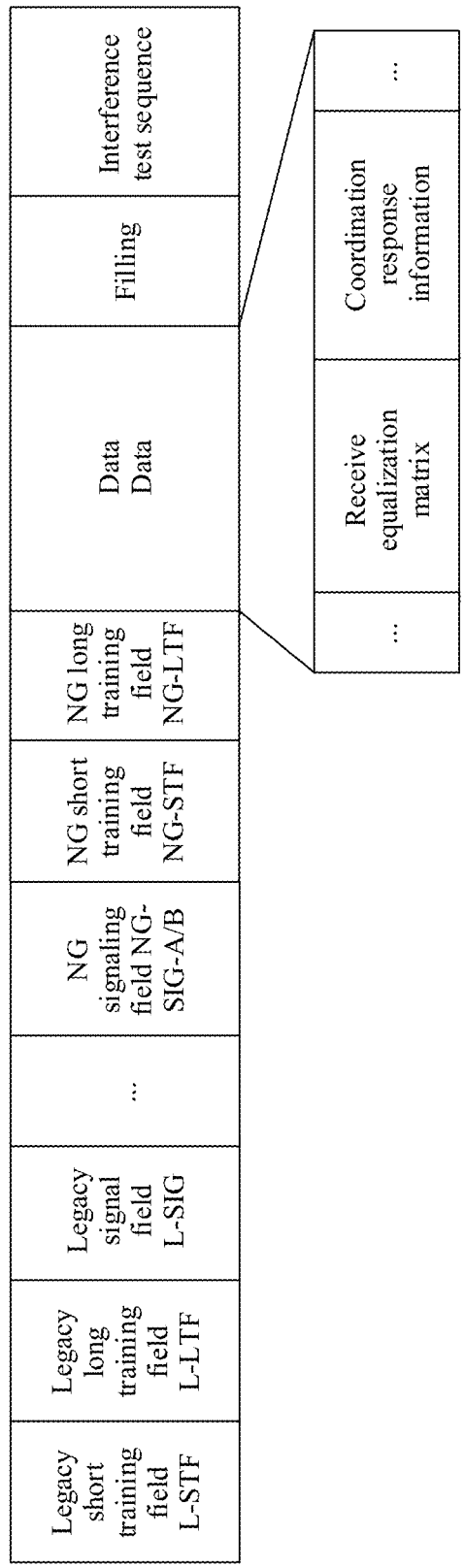
FIG. 7f is a schematic diagram of another information format of a coordinated (parallel) transmission response according to this application.

The interference test information may be sent together with or separately from the response information indicating that the AP 2 determines to perform coordinated transmission. When the interference test information is sent together with the response information, a frame structure shown in FIG. 7f may be used. Similar to FIG. 7c, a padding field is provided between the data field and the interference test information, this field is used by the AP 1 to prepare to receive, by using the receive equalization matrix $W_1$ carried in the data field, the interference test information sent by the AP 2 by using $Q_2'$. When the interference test information is sent separately from the response information, a frame structure shown in FIG. 7g may be used.

It should be noted that S202 to S204, and S205 to S207 are not necessarily performed in a particular order, and are merely different processing in different cases.

S208. The AP 1 performs an interference test based on the received interference test information, to determine not to perform coordinated transmission with the AP 2.

The AP 1 tests, by using the interference test information, whether interference to the AP 2 exceeds a predetermined threshold. For a case of S202 to S204, ideally, sending data processed by using $Q_2$ does not cause interference to the AP 1. However, if $Q_2$ obtained by the AP 2 is not accurate enough, or considering that the receive end in the cell uses another precoding matrix, interference may be caused. If the interference exceeds the threshold, the AP 1 may choose not to perform coordinated transmission with the AP 2, and if the interference does not exceed the threshold, the AP 1 may choose to perform coordinated transmission with the AP 2. Optionally, if the interference is equal to the threshold, the AP 1 may choose not to perform coordinated transmission with the AP 2, or may choose to perform coordinated transmission with the AP 2.

For a case of S205 to S207, ideally, when the AP 1 receives, by using $W_1$, data sent by using $Q_2'$, no interference is caused to the AP 1. However, if $Q_2'$ or $W_1$ obtained by the AP 2 is not accurate enough, or considering that the receive end in the cell uses another precoding matrix, and having considered receiving of data sent by a STA 1, the AP 1 may not use $W_1$ to receive data, interference may be caused. If the interference exceeds the threshold, the AP 1 may choose not to perform coordinated transmission with the AP 2, and if the interference does not exceed the threshold, the AP 1 may choose to perform coordinated transmission with the AP 2. Optionally, if the interference is equal to the threshold, the AP 1 may choose not to perform coordinated transmission with the AP 2, or may choose to perform coordinated transmission with the AP 2.

S209. When choosing not to perform coordinated transmission with the AP 2, the AP 1 sends information indicating that the AP 1 is not to perform coordinated transmission with the AP 2.

This step is similar to S107 in Embodiment 1. For a detailed description, refer to S107. Details are not described herein again.

S210. The AP 1 performs the interference test based on the received interference test information, to determine to perform coordinated transmission with the AP 2.

The AP 1 tests, by using the interference test information, whether interference to the AP 2 exceeds the predetermined threshold; and if the interference does not exceed the threshold, may choose to perform coordinated transmission with the AP 2. Optionally, if the interference is equal to the threshold, the AP 1 may choose to perform coordinated transmission with the AP 2.

S211. When choosing to perform coordinated transmission with the AP 2, the AP 1 sends information indicating that the AP 1 is to perform coordinated transmission with the AP 2.

If the AP 1 chooses to perform coordinated transmission, in a case of unilateral beamforming, after receiving a coordination acknowledgment frame or a trigger frame, the AP 2 sends downlink data to a to-be-scheduled STA 2 by using $Q_2$, to perform coordinated transmission with the AP 1. In a case of bilateral beamforming, after receiving the coordination acknowledgment frame or the trigger frame, the AP 2 sends downlink data to the to-be-scheduled STA 2 by using $Q_2'$, and the AP 1 receives, by using $W_1$, uplink data sent by the scheduled STA 1. It should be noted that, transmission of the AP 2 and the AP 1 ends at the same time, or downlink transmission of the AP 2 ends earlier than uplink transmission of the AP 1. Time information of the uplink transmission of the AP 1 may be carried in any one of the foregoing messages or frames.

This step is similar to S109 in Embodiment 1. For other related detailed descriptions, refer to S109. Details are not described herein again.

It should be further noted that S208 and S209, and S210 and S211 are not necessarily performed in a particular order, and are merely different processing in different cases.

According to the coordinated transmission control method in this embodiment of this application, an anti-interference beamforming manner is determined based on a specific cell configuration parameter, and whether to perform coordinated transmission is determined based on a dual decision condition of an interference test, so that a spatial control manner for beamforming can be used to prevent unnecessary retransmission resulting from interference caused during actual coordinated transmission, thereby improving communication efficiency.

Embodiment 3

Figure 5:
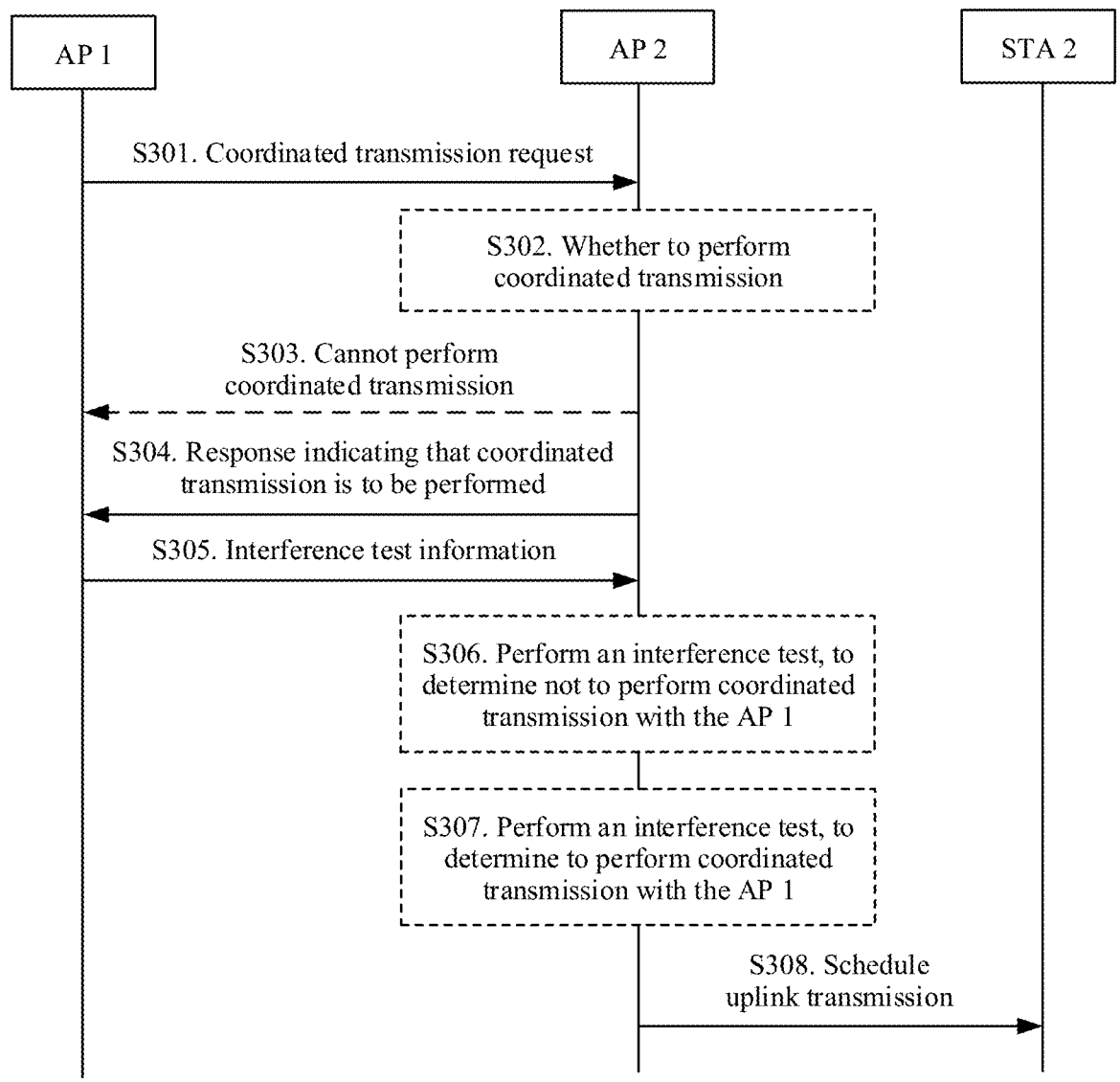
FIG. 5 is a flowchart of a first embodiment of another coordinated transmission control method according to this application.

According to this embodiment of this application, FIG. 5 is a flowchart of a first embodiment of another coordinated transmission control method according to this application. This embodiment is described by using a scenario in which a primary access point AP 1 is to perform downlink transmission and a secondary access point AP 2 is to perform uplink transmission as an example, but no limitation is set thereto. A station correspondingly scheduled by the AP 1 is a STA 1, and a station correspondingly scheduled by the AP 2 is a STA 2. To facilitate understanding of the solution, overall descriptions of this embodiment and subsequent embodiments are provided from a perspective of a plurality of interacting parties. However, this certainly does not mean that steps on all interacting sides in a system are required to be performed together. In the technical solution proposed in this application, an improvement is made on each side of the system. Explanation and details of content the same as that in the foregoing embodiments are not described herein again.

The method includes the following steps.

S301. The AP 1 sends a coordinated transmission request, and the AP 2 receives the coordinated transmission request sent by the AP 1, where the coordinated transmission request carries negotiation parameter information.

After an AP obtains a right to use a channel or is elected from the system, the AP is determined as a primary AP (that is, the AP 1), and other APs in the system are secondary APs (for example, the AP 2 and an AP 3). In this case, data transmission of the AP 1 and scheduling of the station STA 1 corresponding to the AP 1 need to be ensured in the system. The AP 1 determines to schedule the STA 1 to perform uplink transmission, and sends the coordinated transmission request to at least secondary AP (for example, the AP 2). Optionally, an action (Action) frame may be used as an information format of the coordinated transmission request. For a specific structure of the frame, refer to FIG. 3. The coordinated transmission request may carry negotiation parameter information, optionally including at least one of the following: a quantity of antennas of the AP 1, a quantity of spatial flows in a cell 1 served by the AP 1, a basic service set color (Basic Service Set Color, BSS Color for short) used to identify a cell served by the AP 1, a transmitter address (that is, an address of the AP 1), an uplink/downlink indication used to indicate whether the AP 1 is to perform uplink transmission or to perform downlink transmission (the AP 1 is to perform downlink transmission in this embodiment), a receiver address (that is, an address of the AP 2), and a bandwidth/resource block used by the STA 1 to receive data. The foregoing parameter information does not constitute any limitation on this application. For example, the parameter information may further include transmit power and modulation and coding information.

S302. The AP 2 determines, based on the negotiation parameter information, whether to perform coordinated transmission with the AP 1.

The AP 2 may determine, based on the negotiation parameter information, whether to perform coordinated transmission with the AP 1. For example, the AP 2 determines, based on the quantity of spatial flows and information about the quantity of antennas of the AP 1 in combination with a quantity of antennas of the AP 2, whether the AP 2 can perform coordinated transmission with the AP 1. For example, if the quantity of spatial flows is equal to the quantity of antennas of the AP 1, and the quantity of antennas of the AP 2 is less than or equal to the quantity of antennas of the AP 1, the AP 2 cannot prevent, by using a reserved spatial direction, interference to uplink data reception performed by the AP 1, and therefore cannot perform coordinated transmission; and if the quantity of spatial flows is less than or equal to the quantity of antennas of the AP 1, and the quantity of antennas of the AP 2 is greater than the quantity of antennas of the AP 1, or if the quantity of spatial flows is less than the quantity of antennas of the AP 1, and the quantity of antennas of the AP 2 is less than or equal to the quantity of antennas of the AP 1, the AP 2 can prevent, by using a reserved spatial direction, interference to uplink data reception performed by the AP 1, and therefore can perform coordinated transmission. The foregoing is merely an example of this application. A manner in which the AP 2 determines whether to coordinate with the AP 1 is not limited thereto.

S303. When determining not to perform coordinated transmission with the AP 1, the AP 2 feeds back, to the AP 1, information indicating that the AP 2 cannot perform coordinated transmission.

This step is an optional step. When determining not to perform coordinated transmission with the AP 1, the AP 2 may feed back, by using this step, the information indicating that the AP 2 cannot perform coordinated transmission, to notify the AP 1. Optionally, if determining not to perform coordinated transmission with the AP 1, the AP 2 may not reply to the coordinated transmission request within a preset time, so that the AP 1 determines that the AP 2 cannot perform coordinated transmission. In this case, an operation of this step is not required.

If the AP 2 cannot perform coordinated transmission, the AP 1 may continue to select a secondary AP (for example, the AP 3) in another cell to perform coordinated transmission, or perform single-cell transmission.

S304. When determining to perform coordinated transmission with the AP 1, the AP 2 sends, to the AP 1, response information indicating that the AP 2 determines to perform coordinated transmission.

When determining to perform coordinated transmission with the AP 1, the AP 2 sends, to the AP 1, response information indicating that the AP 2 determines to perform coordinated transmission. The response information may be sent by using a coordinated transmission response frame, and an information format of the response information may be an existing information format. As shown in FIG. 7a, for a specific description, refer to the related description in Embodiment 1. Details are not described herein again. The data field indicates that the AP 2 expects to perform coordinated transmission.

S305. The AP 1 sends interference test information, and the AP 2 receives the interference test information.

Figure 7G:
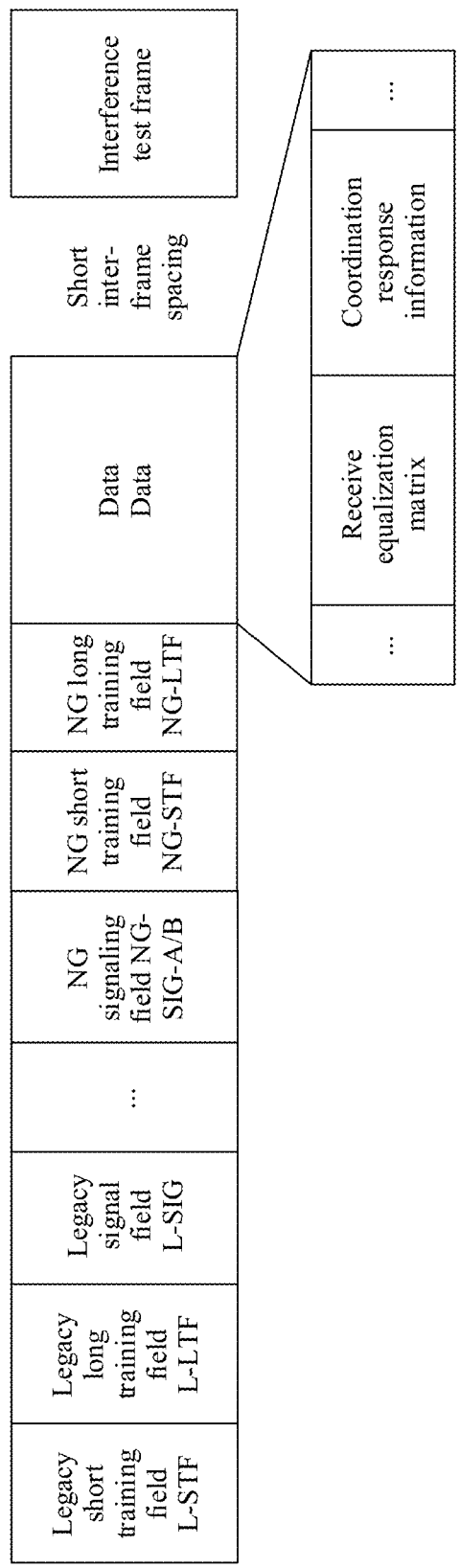
FIG. 7g is a schematic diagram of a transmission mode for coordinated (parallel) transmission response information and interference test information according to this application.

There are two optional implementations for sending the interference test information by the AP 1. A first implementation is that the AP 1 may separately send the interference test information to the AP 2, and a second implementation is that the AP 1 may reuse a downlink data packet sent to the STA 1 as the interference test information, and omnidirectionally send the downlink data packet, so that the AP 2 can receive the interference test information. There are two cases for the second implementation. One case is that before formally sending a downlink data packet to the STA 1, the AP 1 first sends a separate downlink data packet to the STA 1 in advance to test interference; and the other case is that a downlink data packet formally sent by the AP 1 to the STA 1 is used to test interference. The data packet may be in an existing information format, as shown in FIG. 7b and FIG. 7g. An NG-STF portion and an NG-LTF portion may be used as test sequences.

The AP 2 may receive the interference test information by using a receive equalization matrix $W_2$ used to prevent the AP 1 from causing interference to data reception performed by the AP 2. Alternatively, considering a transmit-end status in a cell served by the AP 2, the AP 2 receives the interference test information by using another precoding matrix. Optionally, a selection standard of $W_2$ is $H_{21}W_2=0$, where $H_{21}$ is channel estimation information between the AP 1 and the AP 2. This application is not limited thereto.

S306. The AP 2 performs an interference test based on the interference test information, to determine not to perform coordinated transmission with the AP 1.

The AP 2 tests, by using the interference test information, whether interference to the AP 1 exceeds a predetermined threshold; and if the interference exceeds the threshold, may choose not to perform coordinated transmission with the AP 1. In this case, the AP 2 does not schedule the STA 2 corresponding to the AP 2, and does not schedule the STA 2 to perform uplink data transmission. Because downlink data transmission between the STA 1 and the AP 1 needs to be ensured, regardless of whether the AP 2 participates in coordinated transmission, the downlink data transmission of the AP 1 is not affected. Optionally, if the interference is equal to the threshold, the AP 2 may determine not to perform coordinated transmission with the AP 1.

S307. The AP 2 performs the interference test based on the interference test information, to determine to perform coordinated transmission with the AP 1.

The AP 2 tests, by using the interference test information, whether interference to the AP 1 exceeds the predetermined threshold; and if the interference does not exceed the threshold, may choose to perform coordinated transmission with the AP 1. Optionally, if the interference is equal to the threshold, the AP 2 may determine to perform coordinated transmission with the AP 1.

S308. When choosing to perform coordinated transmission with the AP 1, the AP 2 schedules the STA 2 to perform uplink data transmission.

To schedule the STA 2 to perform the uplink data transmission, the AP 2 may send a trigger frame to the STA 2.

Based on different forms used by the AP 1 to send the interference test information in S305, a form used by the AP 2 to send the trigger frame and schedule the STA 2 to perform the uplink data transmission varies.

Figure 8A:
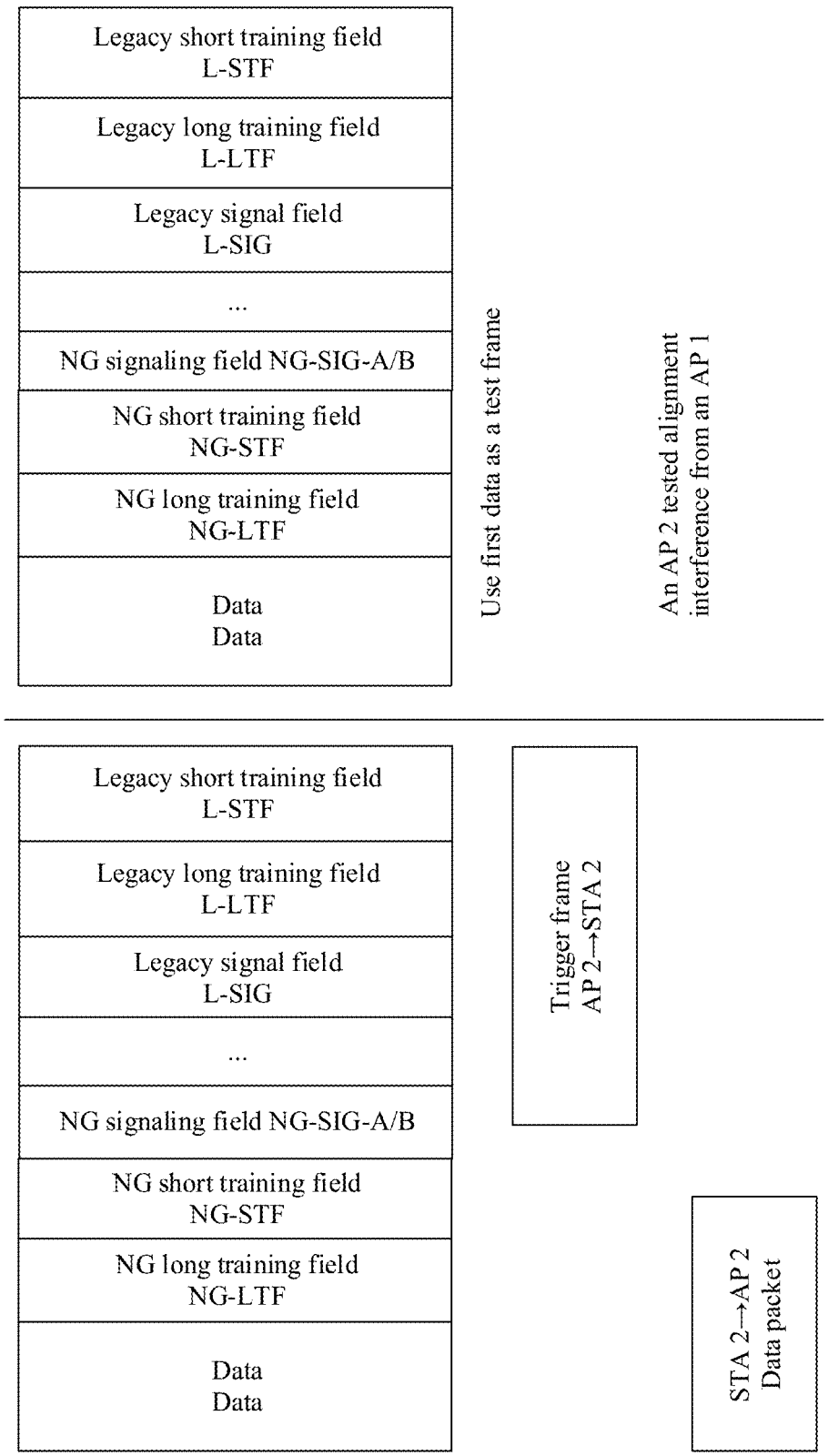
FIG. 8a is a schematic diagram of a scheduling occasion of an AP 2 according to this application.

The case in which the AP 1 separately sends the interference test information to the AP 2, or the AP 1 first sends the separate downlink data packet to the STA 1 in advance to test interference may be shown in a schematic diagram, shown in FIG. 8a, of a scheduling occasion of the AP 2. Transmission of the trigger frame starts before transmission of a data field in a downlink data packet of a next frame formally sent by the AP 1 to the STA 1 ends, may start at the same time as transmission of the downlink data packet of the next frame, or may start at any moment in a transmission process of the downlink data packet of the next frame, but uplink data transmission of the scheduled second STA needs to end before the transmission of the data field in the downlink data packet of the next frame ends, or end at the same time as the transmission of the data field in the downlink data packet of the next frame.

Figure 8B:
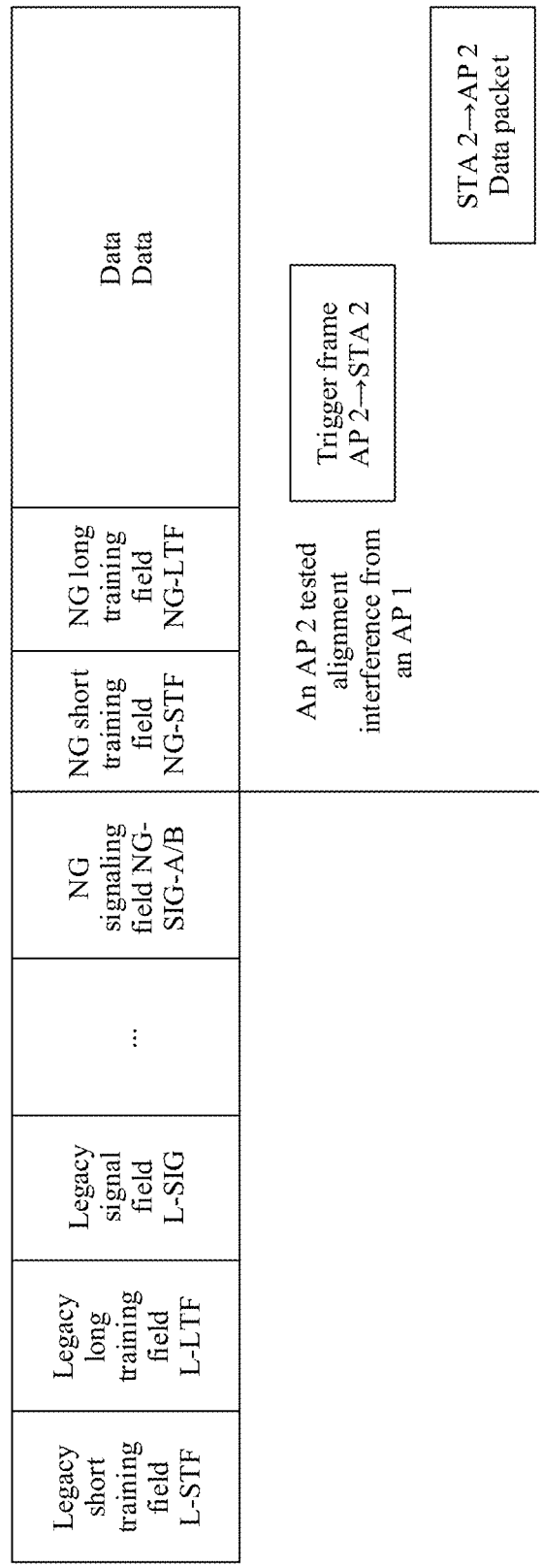
FIG. 8b is another schematic diagram of a scheduling occasion of an AP 2 according to this application.

The case in which the downlink data packet formally sent by the AP 1 to the STA 1 is used to test interference, and a corresponding training field, such as a next generation short training field (Next Generation Short Training Field, NG-STF for short) part and a next generation long training field (Next Generation Long Training Field, NG-LTF for short) part, may be used as a test sequence may be shown in a schematic diagram, shown in FIG. 8b, of a scheduling occasion of the AP 2, transmission of the trigger frame starts in a transmission process of the downlink data packet, and uplink data transmission of the scheduled second STA ends before transmission of a data field in the downlink data packet ends, or ends at the same time as the transmission of the data field in the downlink data packet.

It should be further noted that, S303, S304, and S305 are not necessarily performed in a particular order, and are merely different processing in different cases. S306, S307, and S308 are not necessarily performed in a particular order, and are merely different processing in different cases.

According to the coordinated transmission control method in this embodiment of this application, whether to perform coordinated transmission is determined through inter-cell configuration parameter sharing and based on a dual decision condition of an interference test, so that the access points can learn an interference status in advance, thereby preventing unnecessary retransmission resulting from interference caused during actual coordinated transmission, and improving communication efficiency.

Embodiment 4

Figure 6:
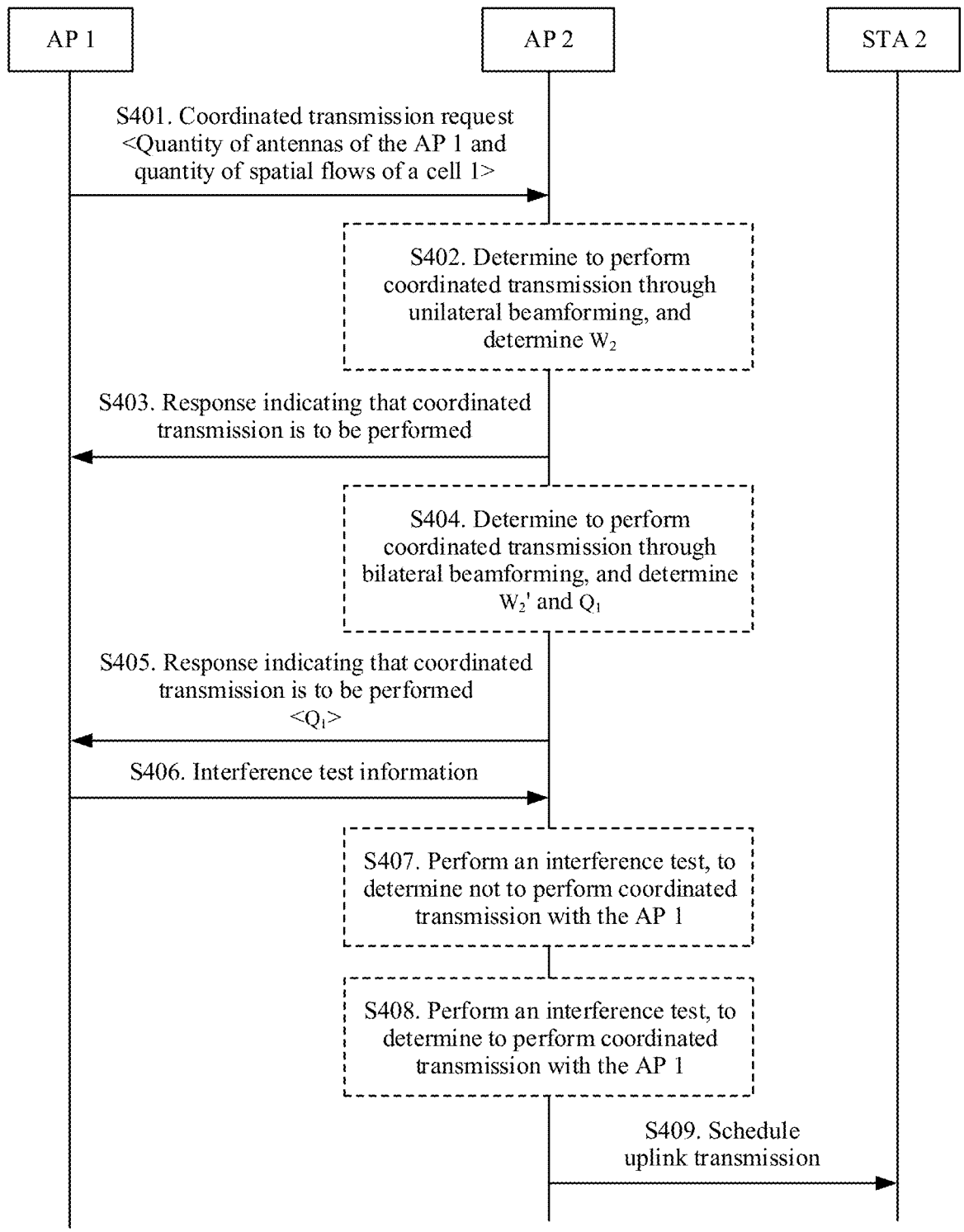
FIG. 6 is a flowchart of a second embodiment of another coordinated transmission control method according to this application.

FIG. 6 is a flowchart of a second embodiment of another coordinated transmission control method according to this application. A difference between this embodiment and Embodiment 3 lies in that: In this embodiment, a case in which an AP 2 determines to perform coordinated transmission is described, and transmission control procedures of coordinated transmission to be performed by the AP 2 in different conditions are specifically distinguished. Content that is the same as or similar to that in Embodiment 3 is not described in this embodiment again.

The method includes the following steps.

S401. An AP 1 sends a coordinated transmission request, and the AP 2 receives the coordinated transmission request sent by the AP 1, where the coordinated transmission request carries negotiation parameter information.

The carried negotiation parameter information mainly includes a quantity of antennas of the AP 1 and a quantity of spatial flows of a cell 1. This step is similar to S301 in Embodiment 3. For a detailed description, refer to S301. Details are not described herein again.

S402. The AP 2 determines, based on the negotiation parameter information, to perform coordinated transmission with the AP 1 through unilateral beamforming, and determines a receive equalization matrix $W_2$.

The AP 2 may determine, based on the quantity of spatial flows and information about the quantity of antennas of the AP 1 in combination with a quantity of antennas of the AP 2, whether the AP 2 can perform coordinated transmission with the AP 1. If the quantity of spatial flows is less than or equal to the quantity of antennas of the AP 1, and the quantity of antennas of the AP 2 is greater than the quantity of antennas of the AP 1, the AP 2 can unilaterally perform receive beamforming on data received by the AP 2 to prevent the AP 1 from causing interference to uplink data reception performed by the AP 2, and therefore can perform coordinated transmission.

The AP 2 may receive data by using the receive equalization matrix $W_2$ used to prevent the AP 1 from causing interference to data reception performed by the AP 2. Optionally, a selection criterion of $W_2$ is $H_{21}W_2=0$, where $H_{21}$ is channel estimation information between the AP 1 and the AP 2. This application is not limited thereto.

S403. When determining to perform coordinated transmission with the AP 1, the AP 2 sends, to the AP 1, response information indicating that the AP 2 determines to perform coordinated transmission.

When determining to perform coordinated transmission with the AP 1, the AP 2 sends, to the AP 1, the response information indicating that the AP 2 determines to perform coordinated transmission. The response information may be sent by using a coordinated transmission response frame, and an information format of the response information may be an existing information format. As shown in FIG. 7a, for a specific description, refer to the related description in the foregoing embodiments. Details are not described herein again. The data field indicates that the AP 2 expects to perform coordinated transmission.

S404. The AP 2 determines, based on the negotiation parameter information, to perform coordinated transmission with the AP 1 through bilateral beamforming, and determines a receive equalization matrix $W_2'$ and a precoding matrix $Q_1$ used by the AP 1 to send data.

The AP 2 may determine, based on the quantity of spatial flows and the information about the quantity of antennas of the AP 1 in combination with the quantity of antennas of the AP 2, whether the AP 2 can perform coordinated transmission with the AP 1. If the quantity of spatial flows is less than the quantity of antennas of the AP 1, and the quantity of antennas of the AP 2 is less than or equal to the quantity of antennas of the AP 1, interference caused by the AP 1 to uplink data reception performed by the AP 2 may be prevented bilaterally by using reserved spatial directions, and therefore coordinated transmission can be performed. The AP 2 not only needs to determine the receive equalization matrix $W_2'$ used by the AP 2 to receive data, but also needs to determine a precoding matrix $Q_1$ used by the AP 1 to send data, that is, the AP 1 performs transmit-end beamforming, and the AP 2 performs receive-end beamforming. $Q_1$ of the AP 1 and $W_2'$ of the AP 2 are determined according to the following optional standard: $W_2'H_{21}Q_1=0$, where $H_{21}$ is channel estimation information between the AP 1 and the AP 2. This application is not limited thereto.

S405. When determining to perform coordinated transmission with the AP 1, the AP 2 sends, to the AP 1, response information indicating that the AP 2 determines to perform coordinated transmission and indication information of the precoding matrix $Q_1$ of the AP 1.

Figure 7H:
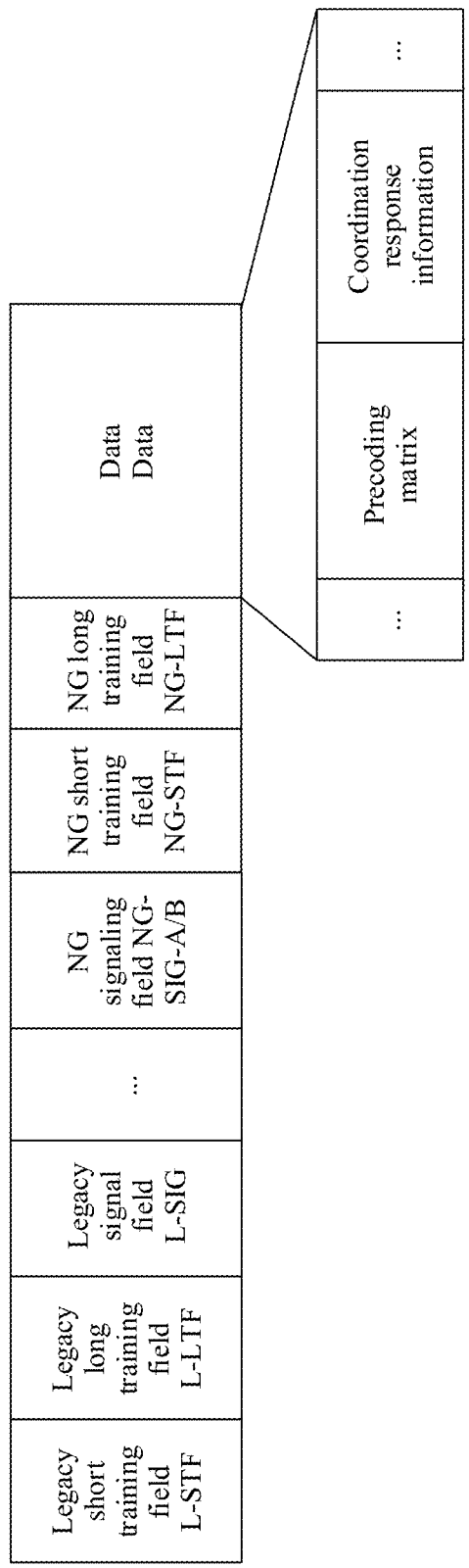
FIG. 7h is a schematic diagram of another information format of a coordinated (parallel) transmission response according to this application.

When determining to perform coordinated transmission with the AP 1, the AP 2 sends, to the AP 1, the response information indicating that the AP 2 determines to perform coordinated transmission. The response information may be sent by using a coordinated transmission response frame, and an information format of the response information may be an existing information format, as shown in FIG. 7h. In addition to coordinated response information indicating whether the AP 2 is to perform coordinated transmission, a data field in the response information further carries information about the precoding matrix $Q_1$ used by the AP 1 to send data.

S406. The AP 1 sends interference test information, and the AP 2 receives the interference test information.

There are two optional implementations for sending the interference test information by the AP 1. A first implementation is that the AP 1 may separately send the interference test information to the AP 2, and a second implementation is that the AP 1 may reuse a downlink data packet sent to a STA 1 as the interference test information, and omnidirectionally send the downlink data packet, so that the AP 2 can receive the interference test information. There are two cases for the second implementation. One case is that before formally sending a downlink data packet to the STA 1, the AP 1 first sends a separate downlink data packet to the STA 1 in advance to test interference; and the other case is that a downlink data packet formally sent by the AP 1 to the STA 1 is used to test interference. The data packet may be in an existing information format, as shown in FIG. 7b and FIG. 7g. The NG-STF portion and the NG-LTF portion may be used as test sequences.

The AP 2 may receive data by using a receive equalization matrix used to prevent the AP 1 from causing interference to data reception performed the AP 2. Alternatively, considering a transmit-end status in a cell served by the AP 2, the AP 2 receives data by using another precoding matrix.

S407. The AP 2 performs an interference test based on the interference test information, to determine not to perform coordinated transmission with the AP 1.

The AP 2 tests, by using the interference test information, whether interference to the AP 1 exceeds a predetermined threshold (optional, the interference to the AP 1 may be equal to the threshold). In a case of unilateral beamforming, ideally, when the AP 2 receives data by using $W_2$, the AP 1 does not cause interference to the AP 2. However, if $W_2$ obtained by the AP 2 is not accurate enough, or considering that the transmit end in the cell uses another precoding matrix, interference may be caused. In a case of bilateral beamforming, ideally, when the AP 1 sends data by using $Q_1$ and the AP 2 receives data by using $W_2'$, the AP 1 does not cause interference to the AP 2. However, if $Q_1$ or $W_2'$ obtained by the AP 2 is not accurate enough, or considering that the receive end in the cell uses another precoding matrix or the AP 2 uses another receive equalization matrix, interference may be caused.

If the interference exceeds the threshold (optional, the interference may be equal to the threshold), the AP 2 may choose not to perform coordinated transmission with the AP 1. In this case, the AP 2 does not schedule a STA 2 corresponding to the AP 2, and does not schedule the STA 2 to perform uplink data transmission. Because downlink data transmission between the STA 1 and the AP 1 needs to be ensured, regardless of whether the AP 2 participates in coordinated transmission, downlink data transmission of the AP 1 is not affected.

S408. The AP 2 performs the interference test based on the interference test information, to determine to perform coordinated transmission with the AP 1.

The AP 2 tests, by using the interference test information, whether interference to the AP 1 exceeds the predetermined threshold; and if the interference does not exceed the threshold, may choose to perform coordinated transmission with the AP 1. Optionally, if the interference is equal to the predetermined threshold, the AP 2 may determine to perform coordinated transmission with the AP 1.

S409. When choosing to perform coordinated transmission with the AP 1, the AP 2 schedules the STA 2 to perform uplink data transmission.

To schedule the STA 2 to perform the uplink data transmission, the AP 2 may send a trigger frame to the STA 2.

Based on different forms used by the AP 1 to send the interference test information in S406, a form used by the AP 2 to send the trigger frame and schedule the STA 2 to perform the uplink data transmission varies.

The case in which the AP 1 separately sends the interference test information to the AP 2, or the AP 1 first sends the separate downlink data packet to the STA 1 in advance to test interference may be shown in a schematic diagram, shown in FIG. 8a, of a scheduling occasion of the AP 2. Transmission of the trigger frame starts before transmission of a data field in a downlink data packet of a next frame formally sent by the AP 1 to the STA 1 ends, and uplink data transmission of the scheduled second STA ends before the transmission of the data field in the downlink data packet of the next frame ends, or ends at the same time as the transmission of the data field in the downlink data packet of the next frame.

The case in which the downlink data packet formally sent by the AP 1 to the STA 1 is used to test interference, and an NG-STF part and an NG-LTF part may be used as test sequences may be shown in a schematic diagram, shown in FIG. 8b, of a scheduling occasion of the AP 2, transmission of the trigger frame starts in a transmission process of the downlink data packet, and uplink data transmission of the scheduled second STA ends before transmission of a data field in the downlink data packet ends, or ends at the same time as the transmission of the data field in the downlink data packet.

It should be further noted that, S402 and S403, and S404 and S405 are not necessarily performed in a particular order, and are merely different processing in different cases. S407, S408, and S409 are not necessarily performed in a particular order, and are merely different processing in different cases.

According to the coordinated transmission control method in this embodiment of this application, an anti-interference beamforming manner is determined based on a specific cell configuration parameter, and whether to perform coordinated transmission is determined based on a dual decision condition of an interference test, so that a spatial control manner for beamforming can be used to prevent unnecessary retransmission resulting from interference caused during actual coordinated transmission, thereby improving communication efficiency.

It should be noted that the foregoing methods are all described by using APs. It can be understood that in some scenarios, a station STA may also be equivalent to the foregoing primary AP or secondary AP, to implement the foregoing method embodiments.

The foregoing describes the solutions provided in the embodiments of this application mainly by using a procedure in which various entities in the system interact with each other to perform coordinated transmission control. It may be understood that to implement the foregoing functions, the foregoing various entities include hardware structures and/or software modules corresponding to the various functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 9:
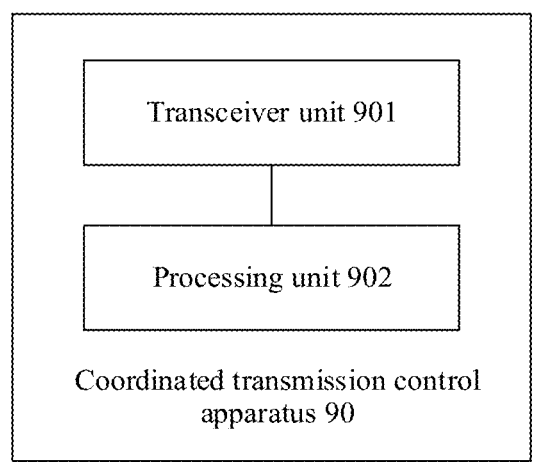
FIG. 9 is a simplified schematic structural diagram of a coordinated transmission control apparatus according to this application.

In the embodiments of this application, the primary AP and the secondary AP may be divided into function modules based on the foregoing method examples. For example, function modules corresponding to various functions are obtained through division, or two or more functions may be integrated into one processing module. The integrated module may be implemented in a form of hardware, or may be implemented in a form of a software function module. FIG. 9 is a simplified schematic structural diagram of a coordinated transmission control apparatus according to this application. The apparatus 90 includes corresponding function modules: a transceiver unit 901 and a processing unit 902. When the apparatus is an apparatus on a secondary AP side, the apparatus is configured to implement a related function of the secondary AP (AP 2). When the apparatus is an apparatus on a primary AP side, the apparatus is configured to implement a related function of the primary AP (AP 1). The transceiver unit 901 is configured to implement a related function of receiving and sending information or data by the AP 1/AP 2, and the processing unit 902 is configured to implement a related function of processing information or data by the AP 1/AP 2. For details, refer to descriptions of implementation of a related network device below. Details are not described herein again. It should be noted that, in this embodiment of this application, module division is used as an example, and is merely a logical function division. In actual implementation, another division manner may be used. The following describes an example in which various function modules corresponding various functions are obtained.

Figure 10:
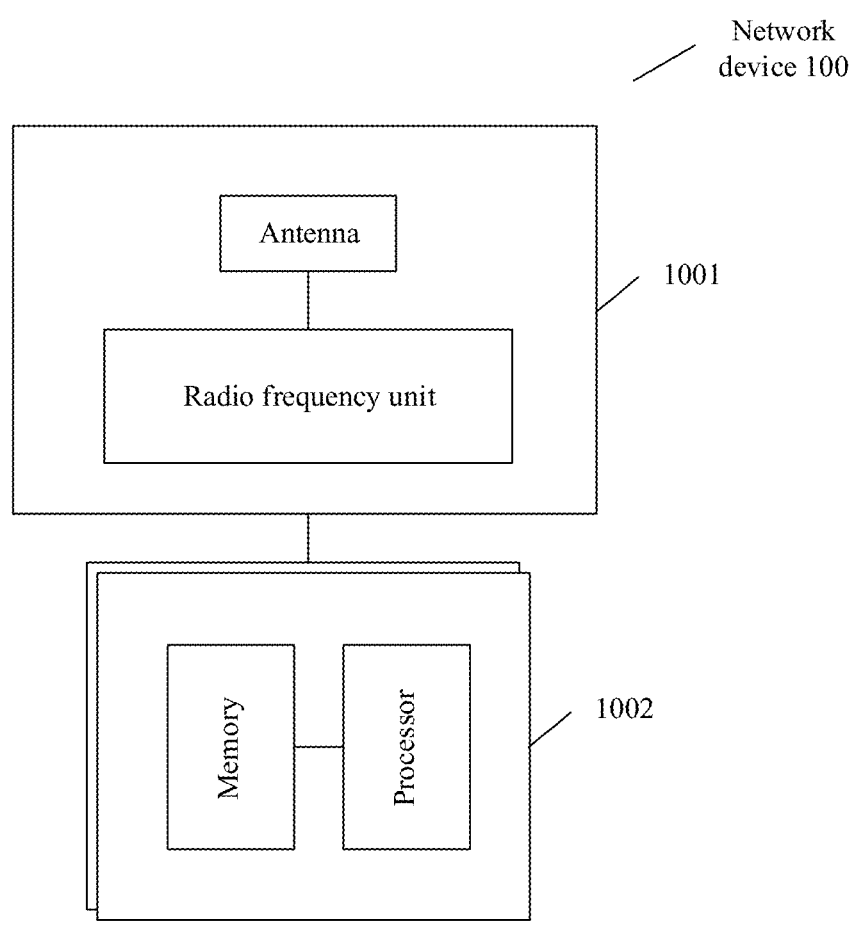
FIG. 10 is a simplified schematic structural diagram of a network device according to this application.

An embodiment of this application further provides a network device. The network device may be used as a coordinated transmission control apparatus on an access point AP side, and is configured to perform the steps performed by the AP 1 or the AP 2 in any one of FIG. 2 and FIG. 4 to FIG. 6. It should be noted that, the network device may alternatively be a station STA that has a capability of implementing the foregoing methods and that is equivalent to the AP 1 or the AP 2. FIG. 10 is a simplified schematic structural diagram of the network device. The network device 100 includes a part 1001 and a part 1002. The part 1001 is mainly configured to receive and send a radio frequency signal and perform conversion on a radio frequency signal and a baseband signal. The part 1002 is mainly configured to perform baseband processing, control the network device 100, and the like. The part 1001 may be usually referred to as a transceiver unit, a transceiver machine, a transceiver circuit, a transceiver, or the like. The part 1002 is usually a control center of the network device 100, and may be usually referred to as a processing unit, a control unit, a processor, a controller, or the like, and is configured to control the network device 100 to perform the steps performed by the AP 1 or the AP 2 in the foregoing related embodiments. For details, refer to the foregoing descriptions of the related parts.

A transceiver unit of the part 1001 may also be referred to as a transceiver machine, a transceiver, or the like. The transceiver unit includes an antenna and a radio frequency unit. The radio frequency unit is mainly configured to perform radio frequency processing. Optionally, a component for implementing a receiving function in the part 1001 may be considered as a receiving unit, and a component for implementing a sending function may be considered as a sending unit. That is, the part 1001 includes a receiving unit and a sending unit. The receiving unit may also be referred to as a receiver machine, a receiver, a receiver circuit, or the like. The sending unit may be referred to as a transmitter machine, a transmitter, a transmitter circuit, or the like.

The part 1002 may include one or more boards. Each board may include one or more processors and one or more memories. The processor is configured to read and execute a program in the memory, to implement a baseband processing function and control the network device 100. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors. The memory and the processor may be integrated together, or may be disposed independently. In some embodiments, the part 1001 and the part 1002 may be integrated together or may be disposed independently. In addition, all functions of the part 1002 may be integrated into one chip for implementation. Alternatively, some functions may be integrated into one chip for implementation and some other functions are integrated into one or more other chips for implementation. This is not limited in this application.

For example, when the network device is used as the primary access point AP 1 or a related function apparatus in the AP 1, and performs the steps performed by AP 1:

In an implementation, the transceiver unit may be configured to perform the steps performed by the AP 1 in S101, S103, S104, S105, S107, and/or S109 in FIG. 2, and/or other steps in this application. The processing unit may be configured to perform S106 and/or S108 in FIG. 2, and/or perform other steps in this application.

For example, in another implementation, the transceiver unit may be configured to perform the steps performed by the AP 1 in S201, S203, S204, S206, S207, S209, and/or S211 in FIG. 4, and/or other steps in this application. The processing unit may be configured to perform S208 and/or S210 in FIG. 4, and/or perform other steps in this application.

For example, in another implementation, the transceiver unit may be configured to perform the steps performed by the AP 1 in S301, S303, S304, and/or S305 in FIG. 5, and/or other steps in this application. The processing unit may be configured to perform other steps in this application.

For example, in another implementation, the transceiver unit may be configured to perform the steps performed by the AP 1 in S401, S403, S405, and/or S406 in FIG. 6, and/or other steps in this application. The processing unit may be configured to perform other steps in this application.

For another example, when the network device is used as the secondary access point AP 2 or a related function apparatus in the AP 2, and performs the steps performed by the AP 2:

In an implementation, the transceiver unit may be configured to perform the steps performed by the AP 2 in S101, S103, S104, S105, S107, and/or S109 in FIG. 2, and/or other steps in this application.

The processing unit may be configured to perform S102 in FIG. 2, and/or perform other steps in this application.

For example, in another implementation, the transceiver unit may be configured to perform the steps performed by the AP 2 in S201, S203, S204, S206, S207, S209, and/or S211 in FIG. 4, and/or other steps in this application. The processing unit may be configured to perform S208 and/or S210 in FIG. 4, and/or perform other steps in this application.

For example, in another implementation, the transceiver unit may be configured to perform the steps performed by the AP 2 in S301, S303, S304, S305 and/or S308 in FIG. 5, and/or other steps in this application. The processing unit may be configured to perform S208 and/or S210 in FIG. 5, and/or perform other steps in this application.

For example, in another implementation, the transceiver unit may be configured to perform the steps performed by the AP 2 in S301, S303, S304, S305 and/or S308 in FIG. 6, and/or other steps in this application. The processing unit may be configured to perform S208 and/or S210 in FIG. 6, and/or perform other steps in this application.

For explanations and beneficial effects of related content in any one of the foregoing provided network devices and corresponding apparatus, refer to the corresponding method embodiments provided above. Details are not described herein again.

A specific implementation form of the apparatus on the primary AP side provided above may be an access point AP or a station STA having a corresponding access function. For example, the apparatus may be an access device or a station device, or may be a chip or a function module in these devices. The foregoing methods may be implemented by using software or hardware, or by executing corresponding software by hardware.

A specific implementation form of the apparatus on the secondary AP side provided above may be an access point AP or a station STA having a corresponding access function. For example, the apparatus may be an access device or a station device, or may be a chip or a function module in these devices. The foregoing methods may be implemented by using software or hardware, or by executing corresponding software by hardware.

For explanations and beneficial effects of related content in any one of the foregoing provided network devices and corresponding apparatus, refer to the corresponding method embodiments provided above. Details are not described herein again.

This application further provides a coordinated transmission control system, including the apparatus on the primary AP side (or a STA apparatus that implements the function on the primary AP side) and the apparatus on the access AP side (or a station STA apparatus that implements the function on the secondary AP side) in the foregoing implementations.

This application further provides a computer program product. When the computer program product is run on a computer, the computer is enabled to perform any method provided above.

This application further provides a chip, where the chip stores an instruction, and when the instruction is run on the foregoing devices, the devices are enabled to perform the foregoing provided methods.

This application further provides a computer storage medium, and the computer storage medium stores a computer program (instruction). When the program (instruction) is run on a computer, the computer is enabled to perform the method according to any one of the foregoing aspects.

All or some of the foregoing embodiments may be implemented by using software, hardware, firmware, or any combination thereof. When a software program is used to implement the embodiments, all or some of the foregoing embodiments may be implemented in a form of a computer program product. The computer program product includes one or more computer instructions. When the computer program instructions are loaded and executed on the computer, the procedure or functions according to the embodiments of this application are all or partially generated. The computer may be a general purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a meaning of plurality. A single processor/controller or another unit may implement several functions enumerated in the claims. Some measures are described in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of the following claims and their equivalent technologies.

What is claimed is:

1. A coordinated transmission control method, wherein the method comprises:
   receiving, by a secondary access point (AP), a coordinated transmission request sent by a primary AP, wherein the coordinated transmission request carries negotiation parameter information;
   sending, by the secondary AP, interference test information to the primary AP when the secondary AP performs coordinated transmission with the primary AP based on the negotiation parameter information; and
   receiving decision information that indicates whether to perform coordinated transmission and that is sent by the primary AP based on the interference test information,
   wherein the negotiation parameter information comprises at least one of the following: a quantity of antennas of the primary AP or a quantity of spatial flows in a cell corresponding to the primary AP, and
   wherein the sending, by the secondary AP, the interference test information to the primary AP comprises:
   if the quantity of spatial flows is less than or equal to the quantity of antennas of the primary AP, and a quantity of antennas of the secondary AP is greater than the quantity of antennas of the primary AP, sending, by the secondary AP, the interference test information to the primary AP by using a first precoding matrix $Q_2$, wherein $Q_2$ is a precoding matrix that is used to prevent interference to data reception performed by the primary AP and that is determined by the secondary AP according to a preset first standard; or
   if the quantity of spatial flows is less than the quantity of antennas of the primary AP, and a quantity of antennas of the secondary AP is less than or equal to the quantity of antennas of the primary AP, sending, by the secondary AP, second indication information to the primary AP to indicate a receive equalization matrix $W_1$ used by the primary AP to receive data, and sending the interference test information by using a second precoding matrix $Q_2'$, wherein $Q_2'$ is a precoding matrix that is used to prevent interference to data reception performed by the primary AP, that is used by the secondary AP to send data, and that is determined by the secondary AP according to a preset second standard.

2. The method according to claim 1, wherein the method further comprises:
   when the secondary AP does not perform the coordinated transmission with the primary AP based on the negotiation parameter information, skipping, by the secondary AP, providing a feedback to the primary AP within a preset time, or sending first response information to the primary AP to indicate that the secondary AP cannot perform the coordinated transmission.

3. The method according to claim 1, wherein the method further comprises:
   when the secondary AP performs the coordinated transmission with the primary AP, sending, by the secondary AP, second response information to the primary AP to indicate that the secondary AP expects to perform the coordinated transmission, wherein
   the second response information is sent together with or separately from the interference test information.

4. The method according to claim 3, wherein the coordinated transmission request carries first indication information, and the first indication information is used to indicate whether the interference test information is sent together with the second response information.

5. The method according to claim 1, wherein the decision information is carried in a coordination acknowledgment frame or is carried in an uplink transmission trigger frame sent to a to-be-scheduled station STA.

6. The method according to claim 1, wherein
the preset first standard is $H_{21}Q_2=0$, wherein $H_{21}$ is channel estimation information between the primary AP and the secondary AP; and
the preset second standard is $W_1H_{21}Q_2'=0$, wherein $H_{21}$ is channel estimation information between the primary AP and the secondary AP.

7. A coordinated transmission control apparatus, wherein the apparatus is in communication with a secondary access point (AP), and comprises at least one processor, wherein the at least one processor is configured to execute an instruction in a memory, and cause the apparatus to implement, based on the instruction:
receiving a coordinated transmission request sent by a primary AP, wherein the coordinated transmission request carries negotiation parameter information;
sending interference test information to the primary AP when the secondary AP performs coordinated transmission with the primary AP based on the negotiation parameter information; and
receiving decision information that indicates whether to perform coordinated transmission and that is sent by the primary AP based on the interference test information,
wherein the negotiation parameter information comprises at least one of the following: a quantity of antennas of the primary AP or a quantity of spatial flows in a cell corresponding to the primary AP, and
wherein the at least one processor is configured to execute the instruction in the memory, and cause the apparatus to further implement, based on the instruction:
if the quantity of spatial flows is less than or equal to the quantity of antennas of the primary AP, and a quantity of antennas of the secondary AP is greater than the quantity of antennas of the primary AP, sending the interference test information to the primary AP by using a first precoding matrix $Q_2$, wherein $Q_2$ is a precoding matrix that is used to prevent interference to data reception performed by the primary AP and that is determined by the secondary AP according to a preset first standard; or
if the quantity of spatial flows is less than the quantity of antennas of the primary AP, and a quantity of antennas of the secondary AP is less than or equal to the quantity of antennas of the primary AP, sending second indication information to the primary AP to indicate a receive equalization matrix $W_1$ used by the primary AP to receive data, and sending the interference test information by using a second precoding matrix $Q_2'$, wherein $Q_2'$ is a precoding matrix that is used to prevent interference to data reception performed by the primary AP, that is used by the secondary AP to send data, and that is determined by the secondary AP according to a preset second standard.

8. The apparatus according to claim 7, wherein the at least one processor is configured to execute the instruction in the memory, and cause the apparatus to further implement, based on the instruction:
when the secondary AP does not perform the coordinated transmission with the primary AP based on the negotiation parameter information, skipping providing a feedback to the primary AP within a preset time, or sending first response information to the primary AP to indicate that the secondary AP cannot perform the coordinated transmission.

9. The apparatus according to claim 7, wherein the at least one processor is configured to execute the instruction in the memory, and cause the apparatus to further implement, based on the instruction:
when the secondary AP performs the coordinated transmission with the primary AP, sending second response information to the primary AP to indicate that the secondary AP expects to perform the coordinated transmission, wherein
the second response information is sent together with or separately from the interference test information.

10. The apparatus according to claim 9, wherein the coordinated transmission request carries first indication information, and the first indication information is used to indicate whether the interference test information is sent together with the second response information.

11. The apparatus according to claim 7, wherein the decision information is carried in a coordination acknowledgment frame or is carried in an uplink transmission trigger frame sent to a to-be-scheduled station STA.

12. The apparatus according to claim 7, wherein
the preset first standard is $H_{21}Q_2=0$, wherein $H_{21}$ is channel estimation information between the primary AP and the secondary AP; and
the preset second standard is $W_1H_{21}Q_2'=0$, wherein $H_{21}$ is channel estimation information between the primary AP and the secondary AP.

13. A coordinated transmission control apparatus, wherein the apparatus is in communication with a primary access point (AP), and comprises at least one processor, wherein the at least one processor is configured to execute an instruction in a memory, and cause the apparatus to implement, based on the instruction:
sending a coordinated transmission request to at least one secondary access point (AP), wherein the coordinated transmission request carries negotiation parameter information;
receiving interference test information sent by the secondary AP when the secondary AP performs coordinated transmission with the primary AP based on the negotiation parameter information;
performing a reception interference test based on the interference test information, to determine whether interference is greater than or equal to a predetermined threshold; and
sending, based on a determining result, decision information to the secondary AP to indicate whether the secondary AP performs the coordinated transmission,
wherein the negotiation parameter information comprises at least one of the following: a quantity of antennas of the primary AP or a quantity of spatial flows in a cell corresponding to the primary AP, and
wherein the at least one processor is configured to execute the instruction in the memory, and cause the apparatus to further implement, based on the instruction:
if the quantity of spatial flows is less than or equal to the quantity of antennas of the primary AP, and a quantity of antennas of the secondary AP is greater than the quantity of antennas of the primary AP, sending the interference test information to the primary AP by using a first precoding matrix $Q_2$, wherein $Q_2$ is a precoding matrix that is used to prevent interference to data reception performed by the primary AP and that is determined by the secondary AP according to a preset first standard; or if the quantity of spatial flows is less than the quantity of antennas of the primary AP, and a quantity of antennas of the secondary AP is less than or equal to the quantity of antennas of the primary AP, sending second indication information to the primary AP to indicate a receive equalization matrix $W_1$ used by the primary AP to receive data, and sending the interference test information by using a second precoding matrix $Q_2'$, wherein $Q_2'$ is a precoding matrix that is used to prevent interference to data reception performed by the primary AP, that is used by the secondary AP to send data, and that is determined by the secondary AP according to a preset second standard.

14. The apparatus according to claim 13, wherein the at least one processor is configured to execute the instruction in the memory, and cause the apparatus to further implement, based on the instruction:

when the secondary AP determines, based on the negotiation parameter information, to skip performing the coordinated transmission with the primary AP, receiving no feedback from the secondary AP within a preset time, or receiving first response information sent by the secondary AP, wherein the first response information is used to indicate that the secondary AP cannot perform the coordinated transmission.

15. The apparatus according to claim 13, wherein the at least one processor is configured to execute the instruction in the memory, and cause the apparatus to further implement, based on the instruction:

when the secondary AP performs the coordinated transmission with the primary AP, receiving second response information sent by the secondary AP, wherein the second response information is used to indicate that the secondary AP expects to perform the coordinated transmission, wherein the second response information is sent together with or separately from the interference test information.

16. The apparatus according to claim 15, wherein the coordinated transmission request carries first indication information, and the first indication information is used to indicate whether the interference test information is sent together with the second response information.

* * * * *